United States Patent
Boutani et al.

(10) Patent No.: US 12,435,983 B2
(45) Date of Patent: Oct. 7, 2025

(54) VEHICLE ALLOCATION CONTROL DEVICE, VEHICLE ALLOCATION CONTROL SYSTEM, AND VEHICLE ALLOCATION CONTROL METHOD

(71) Applicants: Nissan Motor Co., Ltd., Kanagawa (JP); RENAULT S.A.S., Boulogne-Billancourt (FR)

(72) Inventors: Hidenori Boutani, Kanagawa (JP); Masayasu Suzuki, Kanagawa (JP); Tomoki Hirabayashi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 224 days.

(21) Appl. No.: 17/996,172

(22) PCT Filed: Apr. 16, 2020

(86) PCT No.: PCT/IB2020/000373
§ 371 (c)(1),
(2) Date: Oct. 13, 2022

(87) PCT Pub. No.: WO2021/209781
PCT Pub. Date: Oct. 21, 2021

(65) Prior Publication Data
US 2023/0221129 A1    Jul. 13, 2023

(51) Int. Cl.
*G01C 21/34* (2006.01)
*G06Q 10/02* (2012.01)

(52) U.S. Cl.
CPC ..... *G01C 21/3453* (2013.01); *G01C 21/3407* (2013.01); *G06Q 10/02* (2013.01)

(58) Field of Classification Search
CPC ............ G01C 21/3453; G01C 21/3407; G01C 21/3438; G06Q 10/02; G06Q 10/047; G08G 1/0969; G08G 1/123
See application file for complete search history.

(56) References Cited

U.S. PATENT DOCUMENTS 9,702,715 B2 *   7/2017  Cooper .............. G01C 21/3415
10,303,961 B1 *  5/2019  Stoffel .................... H04W 4/44
(Continued)

FOREIGN PATENT DOCUMENTS

CN   110520912 A    11/2019
JP   2002245591 A    8/2002
(Continued)

*Primary Examiner* — Kenny Nguyen
(74) *Attorney, Agent, or Firm* — Osha Bergman Watanabe & Burton LLP

(57) ABSTRACT

A vehicle allocation control device, when a forgotten item in the vehicle is detected after setting a first travel route including a drop-off place, is configured to: calculate a first time at which the vehicle arrives at the drop-off place by travelling along the set first travel route, set at least one second travel route which is different from the first travel route and goes through a facility for depositing the forgotten item, calculate a second time at which the vehicle arrives at the drop-off place by travelling along the second travel route, and change the first travel route to the second travel route where a time difference between the first time and the second time is equal to or less than a permissible time.

12 Claims, 14 Drawing Sheets

(56) References Cited

U.S. PATENT DOCUMENTS

| | | | |
|---|---|---|---|
| 11,087,268 B2* | 8/2021 | Barbush | G06Q 10/08355 |
| 11,625,926 B2* | 4/2023 | Yamada | G06F 18/22 |
| | | | 382/100 |
| 11,893,527 B2* | 2/2024 | Smith | G01C 21/3407 |
| 12,043,241 B2* | 7/2024 | Follen | B60L 7/10 |
| 2002/0055818 A1* | 5/2002 | Gaspard, II | G08G 1/202 |
| | | | 701/410 |
| 2008/0242227 A1* | 10/2008 | Cheng | H04N 21/43637 |
| | | | 455/41.2 |
| 2011/0166775 A1* | 7/2011 | Takeuchi | G01C 21/343 |
| | | | 701/533 |
| 2011/0227532 A1* | 9/2011 | Niwa | G01C 21/3469 |
| | | | 320/109 |
| 2015/0154559 A1* | 6/2015 | Barbush | G06Q 10/08355 |
| | | | 705/338 |
| 2015/0177012 A1* | 6/2015 | Cooper | G01C 21/3415 |
| | | | 701/416 |
| 2018/0080776 A1* | 3/2018 | Nimchuk | G01C 21/3415 |
| 2018/0227393 A1* | 8/2018 | Daub | H04L 67/01 |
| 2019/0120639 A1* | 4/2019 | Song | G01C 21/3484 |
| 2019/0316926 A1* | 10/2019 | Wang | G01C 21/3484 |
| 2020/0005059 A1* | 1/2020 | Yamada | G08B 21/24 |
| 2020/0103241 A1* | 4/2020 | Yoshida | G01C 21/3438 |
| 2020/0160277 A1* | 5/2020 | Weldemariam | G06Q 10/1093 |
| 2020/0240808 A1* | 7/2020 | Beaurepaire | G01C 21/3461 |
| 2021/0056483 A1* | 2/2021 | Kajiwara | G08G 1/13 |
| 2021/0090004 A1* | 3/2021 | Smith | G06Q 10/083 |
| 2023/0213348 A1* | 7/2023 | Yamada | G08B 25/00 |
| | | | 382/100 |

FOREIGN PATENT DOCUMENTS

| | | |
|---|---|---|
| JP | 2003121182 A | 4/2003 |
| JP | 2010025783 A | 2/2010 |
| JP | 2017053640 A | 3/2017 |
| JP | 2019096263 A | 6/2019 |
| JP | 2019168815 A | 10/2019 |
| WO | 2013137077 A1 | 9/2013 |

* cited by examiner

VEHICLE ALLOCATION CONTROL DEVICE, VEHICLE ALLOCATION CONTROL SYSTEM, AND VEHICLE ALLOCATION CONTROL METHOD

TECHNICAL FIELD

The present invention relates to a vehicle allocation control device, a vehicle allocation control system, and a vehicle allocation control method.

BACKGROUND ART

There is a hitherto known invention in which a user who has forgotten an item in a vehicle receives such a forgotten item (Patent Literature 1). In the invention disclosed in Patent Literature 1, a user who has forgotten an item is specified, and the forgotten item is delivered to the user based on the position information of the terminal device of the user.

CITATION LIST

Patent Literature

Patent Literature 1: Japanese Unexamined Patent Application Publication No. 2002-245591

SUMMARY OF THE INVENTION

Technical Problem

However, in the case where a next user's vehicle allocation request is received, when a forgotten item is delivered to the user who has forgotten the item as in the invention disclosed in Patent Literature 1, there is a possibility that the vehicle allocation request requirement (such as waiting time) cannot be satisfied.

The present invention has been made in view of the above described problem, and it is an object of the present invention to provide a vehicle allocation control device, a vehicle allocation control system, and a vehicle allocation control method for responding to a user who has forgotten an item in such a way as to satisfy a vehicle allocation request requirement of the next user who has transmitted a vehicle allocation request.

Technical Solution

A vehicle allocation control device according to one aspect of the present invention, when a forgotten item in a vehicle is detected after setting a first travel route including a drop-off place, calculates a first time at which the vehicle arrives at the drop-off place by travelling along the set first travel route. The vehicle allocation control device sets at least one second travel route which is different from the first travel route and goes through a facility for depositing the forgotten item. The vehicle allocation control device calculates a second time at which the vehicle arrives at the drop-off place by travelling along the second travel route. The vehicle allocation control device changes the first travel route to the second travel route where a time difference between the first time and the second time is equal to or less than a permissible time.

Advantageous Effect of the Invention

The present invention makes it possible to respond to a user who has forgotten an item in such a way as to satisfy a vehicle allocation request requirement of the next user who has transmitted a vehicle allocation request.

DESCRIPTION OF EMBODIMENTS

Figure 1:
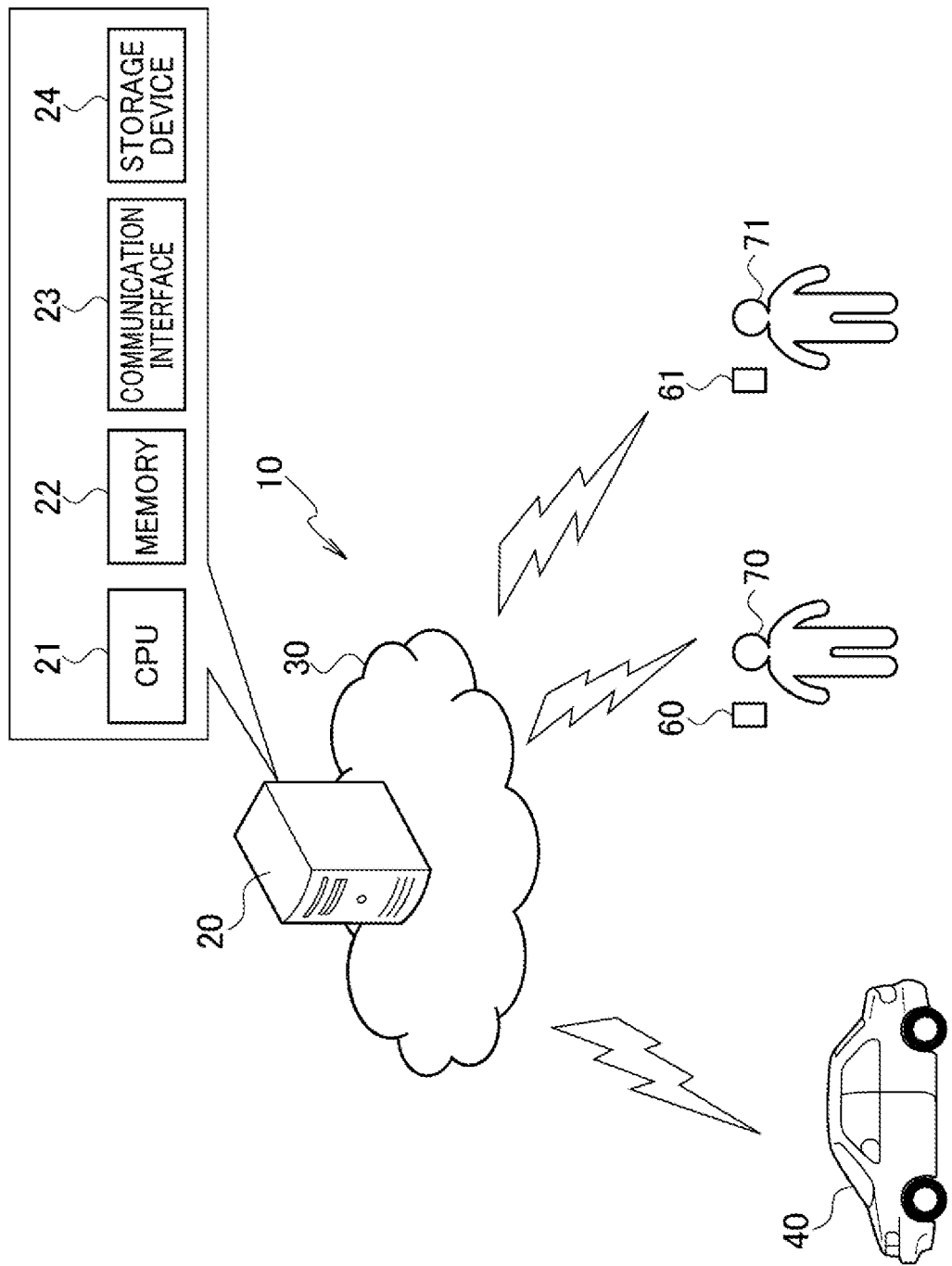
FIG. 1 is an overall schematic diagram of a vehicle allocation control system 10 according to a first embodiment of the present invention.

Embodiments of the present invention will be described below with reference to the drawings. In the drawings, the same parts are denoted by the same reference numerals and the description thereof is omitted.

First Embodiment (Configuration Example of Vehicle Allocation Control System]

Figure 2:
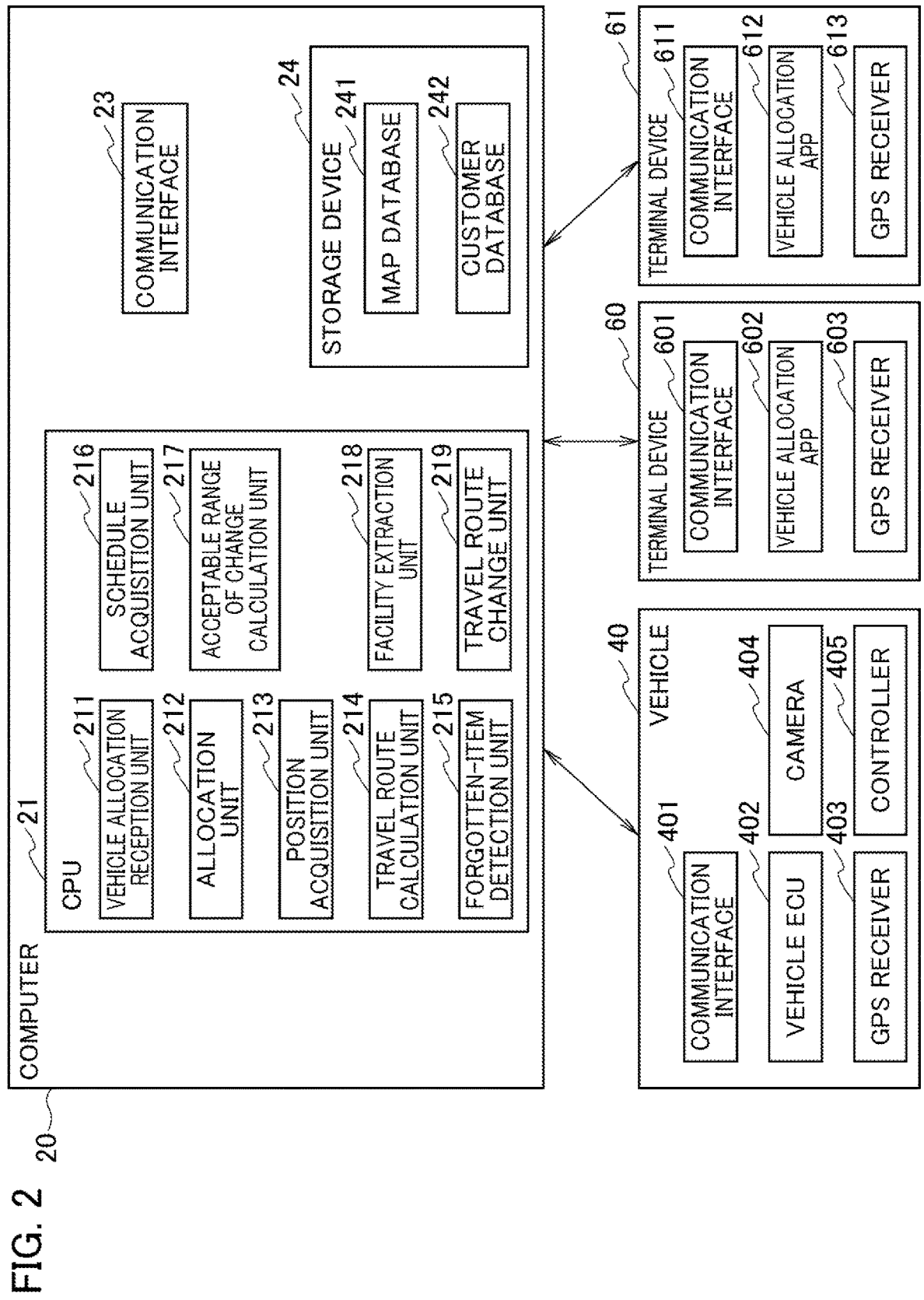
FIG. 2 is a functional block diagram of a computer 20, a vehicle 40, and terminal devices 60 and 61 according to the first embodiment of the present invention.

Referring to FIGS. 1 to 2, a configuration example of a vehicle allocation control system 10 according to a first embodiment will be described. As illustrated in FIG. 1, the vehicle allocation control system 10 includes a computer 20 (vehicle allocation control device), a communication network 30, a vehicle 40, a user 70, a terminal device 60 possessed by the user 70, a user 71, and a terminal device 61 possessed by the user 71.

The computer 20 communicates with the vehicle 40 and the terminal devices 60 and 61 via the communication network 30. The computer 20 includes a central processing unit (CPU) 21, a memory 22, a communication I/F interface 23, and a storage device 24, and these components are electrically connected via a bus (not illustrated) or the like. The position where the computer 20 is installed is not particularly limited, and for example, the computer 20 is installed in a management center of a business operator managing the vehicle 40.

The CPU 21 reads various programs stored in the storage device 24 or the like into the memory 22 and executes various instructions included in the programs. The memory 22 is a storage medium such as a read only memory (ROM) or a random access memory (RAM). The storage device 24 is a storage medium such as a hard disk drive (HDD). A part (or all) of the vehicle allocation control system 10, including the functions of the computer 20 described below, may be provided by an application (such as Software as a Service (SaaS)) provided on the communication network 30. The computer 20 may be a server.

The communication interface 23 is implemented as hardware such as a network adapter, various communication software, and combinations thereof, and is configured to realize wired or wireless communication via the communication network 30 or the like.

The communication network 30 may be configured by either wireless or wired methods, or both methods, and the communication network 30 may include the Internet. In this embodiment, the computer 20, the vehicle 40, and the terminal devices 60 and 61 are connected to the communication network 30 by means of a wireless communication system.

The vehicle 40 may be a vehicle with a driver, or an autonomous driving vehicle without a driver. In the first embodiment, the vehicle 40 is described as an autonomous driving vehicle without a driver. The vehicle 40 is not particularly limited, and for example, the vehicle 40 is a taxi.

The user 70 requests a vehicle by using a terminal device 60. A vehicle allocation application (hereinafter simply referred to as a vehicle allocation app) used for requesting a vehicle is installed in the terminal device 60, and the user 70 requests a vehicle by using this vehicle allocation app.

The user 71 has forgotten an item in the vehicle 40 when using the vehicle 40. The user 71 has noticed that he/she has forgotten the item desires to search for the forgotten item by using an exclusive application installed in the terminal device 61. The application for searching for a forgotten item is not limited to a dedicated application, and may be incorporated as a part of the function of the vehicle allocation app.

Next, the computer 20, the vehicle 40, and the terminal devices 60 and 61 will be described in detail with reference to FIG. 2.

The terminal device 60 includes a communication I/F 601, a vehicle allocation app 602, and a GPS receiver 603. The communication I/F 601 has the same configuration as the communication interface 23 (see FIG. 1), and communicates with the computer 20 via the communication network 30. The terminal device 60 is, for example, a smart phone or a tablet. The terminal device 60 may be a wearable device. Although not illustrated, the terminal device 60 also includes a CPU, a memory, a storage device, and the like as in the computer 20.

The vehicle allocation app 602 is used to request a vehicle as described above. The vehicle allocation app 602 functions as a user interface when the user 70 requests a vehicle. The vehicle allocation app 602 is realized by a CPU provided in the terminal device 60 reading and executing a dedicated application program from a storage device provided in the terminal device 60. When the user 70 requests a vehicle, the user 70 inputs a desired boarding place, a desired waiting time, a desired drop-off place, and the like into the vehicle allocation app 602 and requests a vehicle. The terminal device 60 transmits a vehicle allocation request to the computer 20 according to the input of the user 70. In addition, the terminal device 60 displays, on a display provided in the terminal device 60, various kinds of information (receipt of a vehicle allocation request, estimated arrival time, driving route, etc.) included in a signal returned from the computer 20 in response to the vehicle allocation request. However, the implementation of the vehicle allocation app 602 is not limited to this configuration. For example, the terminal device 60 may access a server providing a function of the vehicle allocation app 602, receive the function, and display the execution result of the function transmitted from the server on the browser.

The position information of the terminal device 60 acquired by the GPS receiver 603 is transmitted to the computer 20 at an optional timing.

The terminal device 61 includes a communication I/F 611, a vehicle allocation app 612, and a GPS receiver 613. Since these constituent elements are the same as those of the terminal device 60, the description thereof will be omitted.

As illustrated in FIG. 2, the CPU 21 (controller) of the computer 20 includes, as an example of a plurality of functions, a vehicle allocation reception unit 211, an allocation unit 212, a position acquisition unit 213, a travel route calculation unit 214, a forgotten-item detection unit 215, a schedule acquisition unit 216, an acceptable range of change calculation unit 217, a facility extraction unit 218, and a travel route change unit 219. The storage device 24 of the computer 20 stores a map database 241 and a customer database 242.

The map database 241 stores map information necessary for route guidance such as road information and facility information. Such road information includes the number of lanes on a road, road boundaries, lane connections, speed limits, road signs indicating one-way traffic, etc.

The customer database 242 stores account information such as IDs of the users 70 and 71, and a vehicle usage history. The usage history includes vehicle numbers, boarding dates and times, boarding sections, fares, etc. The ID and the usage history are stored in association with each other.

The vehicle allocation reception unit 211 receives a vehicle allocation request of the user 70 transmitted from the terminal device 60. The vehicle allocation reception unit 211 notifies the terminal device 60 of the fact that the vehicle allocation request of the user 70 has been received, the estimated arrival times for boarding and drop-off places, the travel routes for the boarding and drop-off places, and the like.

The allocation unit 212 allocates a suitable vehicle from among a plurality of vehicles in response to the received vehicle allocation request. For example, to be efficient, the allocation unit 212 can allocate an empty vehicle closest to the boarding place desired by the user 70 from among the plurality of vehicles. In the first embodiment, it is assumed that the vehicle 40 is allocated.

The position acquisition unit 213 acquires position information of the users 70 and 71 from the terminal devices 60 and 61, and acquires position information of the vehicle 40 from the vehicle 40. The position information of the users 70 and 71 means position information of the terminal devices 60 and 61 possessed by the users 70 and 71.

The travel route calculation unit 214 calculates and sets a travel route from the current position of the vehicle 40 to the boarding place desired by the user 70 by referring to the map database 241. The travel route calculation unit 214 transmits a command to the vehicle 40 so as to travel to the boarding place desired by the user 70 along a set travel route. Further, the travel route calculation unit 214 calculates and sets a travel route from the boarding place desired by the user 70 to a drop-off place (destination) desired by the user 70. The travel route calculation unit 214 transmits a command to the vehicle 40 so as to travel to the drop-off place desired by the user 70 along the set travel route. A travel route set by the travel route calculation unit 214 is, for example, a travel route having the shortest time from the current position of the vehicle 40 until the user 70 arrives at the desired drop-off place by going through the boarding place desired by the user 70.

The forgotten-item detection unit 215 receives a signal indicating that a forgotten item search is desired from the user 71, and detects the forgotten item. The forgotten-item detection unit 215 matches the ID of the user 71 included in the signal indicating that the forgotten item search is desired, with the customer database 242 to thereby specify the vehicle in which the user 71 got on last. After specifying the vehicle, the forgotten-item detection unit 215 transmits a signal for detecting the forgotten item to the specified vehicle.

The schedule acquisition unit 216 acquires schedule data of the user 70. The schedule data is data related to an activity schedule of the user 70 such as when, where, and what the user is going to do. The method for acquiring schedule data is not particularly limited, and for example, the schedule acquisition unit 216 may acquire schedule data from the terminal device 60. Alternatively, the schedule acquisition unit 216 may acquire schedule data using a cloud computing service.

The acceptable range of change calculation unit 217 calculates and sets an acceptable range of change in which it is acceptable for a travel route to be changed, such that a time difference between the time when the vehicle 40 arrives at the drop-off place by traveling along a travel route set by the travel route calculation unit 214, and the time when the vehicle 40 arrives at the drop-off place by traveling along a travel route after a change, is equal to or less than the permissible time.

The facility extraction unit 218 extracts a facility for depositing a forgotten item within an acceptable range of change set by the acceptable range of change calculation unit 217. The facility extraction unit 218 extracts a facility by referring to the map database 241.

The travel route change unit 219 changes a travel route so as to go through a facility extracted by the facility extraction unit 218.

The vehicle 40 includes a communication I/F 401, a vehicle ECU (electronic control unit) 402, a GPS receiver 403, a camera 404, and a controller 405. The communication I/F 401 has the same configuration as the communication interface 23 and the communication I/F 601, and communicates with the computer 20 via the communication network 30. The vehicle ECU 402 is a computer for controlling the travel of the vehicle 40. The vehicle ECU 402 controls various actuators (brake actuators, accelerator actuators, steering actuators, etc.) based on commands from the vehicle allocation control system 10. The position information of the vehicle 40 acquired by the GPS receiver 403 is transmitted to the computer 20 at an optional timing.

When the controller 405 receives a signal for detecting a forgotten item from the forgotten-item detection unit 215, the controller 405 photographs the interior of the vehicle 40 by using the camera 404. The controller 405 analyzes the camera image using predetermined image processing. This analysis allows a forgotten item of the user 71 to be detected. The controller 405 transmits a signal indicating that a forgotten item has been detected, to the computer 20.

Next, an operation example of the vehicle allocation control system 10 according to the first embodiment will be described with reference to FIG. 3.

Figure 3:
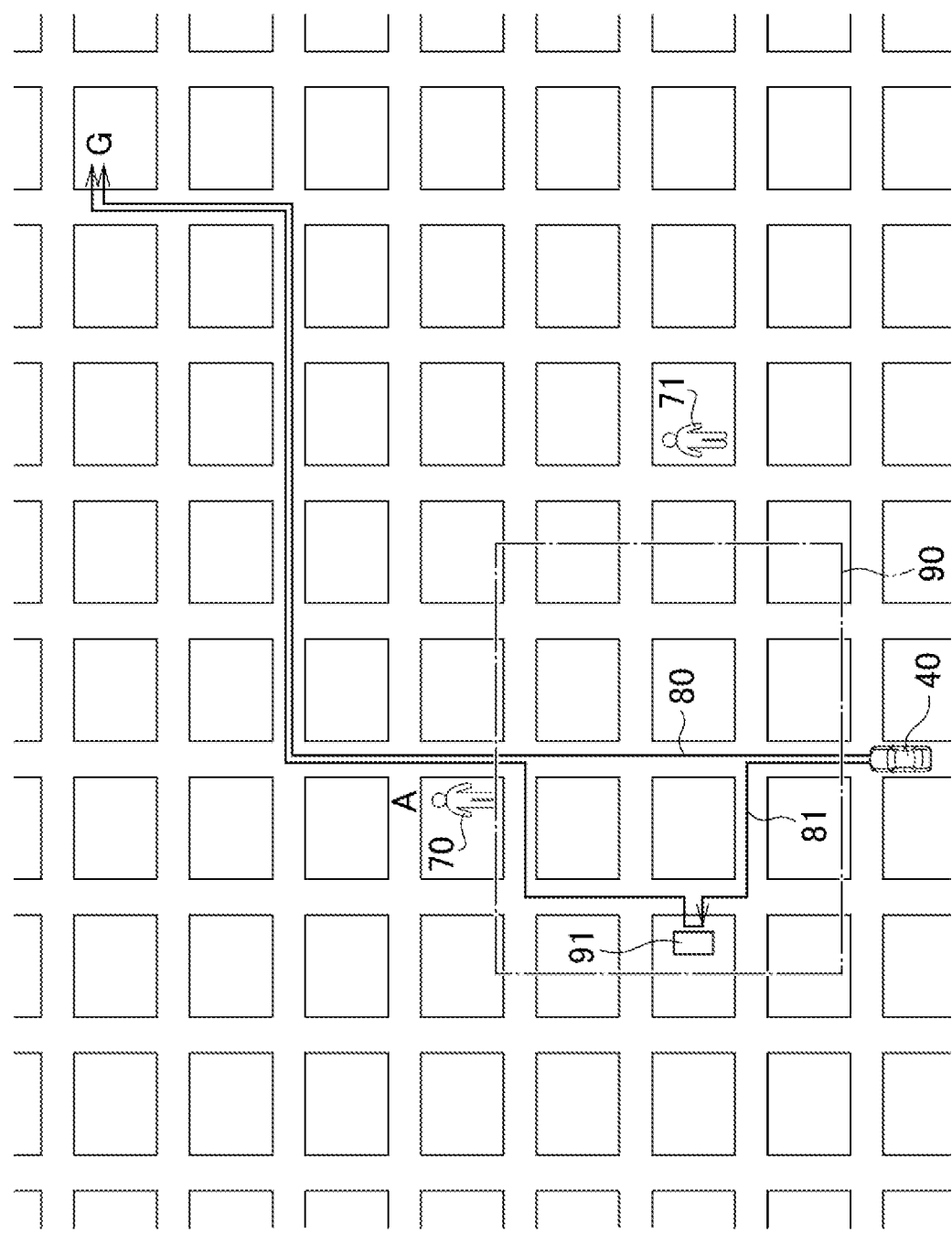
FIG. 3 is a diagram illustrating an example of a method for changing an acceptable range of change 90 and a travel route according to the first embodiment of the present invention.

The scenario illustrated in FIG. 3 is a scenario in which the vehicle 40 allocated by a vehicle allocation request from the user 70 picks up the user 70. There are no passengers in the vehicle 40. "A" in FIG. 3 is a boarding place designated by the user 70. "G" in FIG. 3 indicates a drop-off place (destination) designated by the user 70. The drop-off place "G" is a movie theater. There is a forgotten item (wallet) of the user 71 in the interior of the vehicle 40.

A travel route 80 in FIG. 3 is a travel route set by the travel route calculation unit 214. The travel route 80 is a travel route that arrives at the drop-off place "G" desired by the user 70 from the current position of the vehicle 40 by going through the boarding place "A" desired by the user 70. In addition, the travel route 80 is a travel route having the shortest time from the current position of the vehicle 40 until the user 70 arrives at the desired drop-off place "G" by going through the boarding place "A" desired by the user 70. When the vehicle 40 travels along the travel route 80, the arrival time at the drop-off place "G" is 13:40 p.m.

As described above, the user 71 has forgotten an item in the vehicle 40 when using the vehicle 40. The user 71 who has noticed that he/she has forgotten an item desires to search for the forgotten item by using a dedicated application. As a result, a signal indicating that a forgotten item search is desired (hereinafter referred to as signal S1) is transmitted to the forgotten-item detection unit 215. The signal S1 includes the ID of the user 71, the specific details of the forgotten item (wallet in this case), the date and time of when the vehicle was used, and the like.

Having received the signal S1 from the user 71, the forgotten-item detection unit 215 refers to the customer database 242 to specify the vehicle in which the user 71 got on last. As described above, the customer database 242 stores user IDs, vehicle numbers, boarding dates and times, boarding sections, fares, and the like. The forgotten-item detection unit 215 matches the ID of the user 71 included in the signal S1 with the customer database 242 to thereby specify the vehicle in which the user 71 got on last. Thus, the vehicle in which the user 71 got on last is specified as the vehicle 40. The forgotten-item detection unit 215 transmits a signal for detecting the forgotten item (hereinafter referred to as signal S2) to the specified vehicle 40.

When the controller 405 mounted in the vehicle 40 receives the signal S2 from the forgotten-item detection unit 215, the controller 405 photographs the interior of the vehicle 40 using the camera 404. The controller 405 analyzes the camera image using predetermined image processing. This analysis allows the forgotten item (wallet) of the user 71 to be detected. The controller 405 transmits a signal indicating that the forgotten item has been detected (hereinafter referred to as signal S3), to the computer 20.

In the case where the forgotten item is in the vehicle, since the user 71 is in trouble, it is considered that a forgotten item can be promptly delivered to the user 71 if the vehicle is not scheduled to be allocated. However, the vehicle 40 has received a vehicle allocation request from the user 70 who is different from the user 71 who has forgotten an item. In the first embodiment, the signal S1 is transmitted from the user 71 after the travel route 80 is set. That is, the signal S1 is transmitted from the user 71 when the vehicle 40 is traveling along the travel route 80 or when the vehicle 40 will soon be traveling along the travel route 80. In this situation, when the vehicle 40 goes to the current position of the user 71 to deliver a forgotten item, it is difficult to satisfy the vehicle allocation request requirement desired by the user 70, and thus the user 70 cancels the vehicle allocation request. This may cause an operating loss for the business operator managing the vehicle 40. The vehicle allocation request requirement of the user 70 refers to, as an example, a requirement that satisfies the schedule of the user 70.

Accordingly, in the case where the travel route 80 is changed to a route which goes through a facility where a forgotten item of the user 71 is deposited, the computer 20 estimates whether or not the user 70 will permit the change. For this estimation, when the controller 405 receives the signal S3, the schedule acquisition unit 216 acquires the schedule data of the user 70. It is assumed that user 70 is scheduled to watch a movie at 14:00 p.m.

As described above, when the vehicle 40 travels along the travel route 80, the time at which the vehicle 40 arrives at the drop-off place "G" is 13:40 p.m. Accordingly, when the vehicle 40 travels along the travel route 80, there is a margin of 20 minutes until the movie screening time. Here, even when the vehicle 40 arrives at the drop-off place "G" 10 minutes before the movie screening time, it is considered that the user 70 can make it in time for the movie screening time. In other words, when the vehicle 40 arrives at the drop-off place "G" by 13:50 p.m., the user 70 can watch the movie on time, and thus the user 70 is unlikely to feel dissatisfaction.

When the travel route 80 is to be changed, whether or not the user 70 permits this change depends, for example, on whether or not the time delay in arriving at the drop-off place "G" is less than or equal to the permissible time. In the scenario of FIG. 3, the permissible time for the user 70 is determined based on the movie screening time. When the user 70 arrives at the drop-off place "G" five minutes before the movie screening time (13:55 p.m.), it is estimated that the user 70 does not permit a delay of 15 minutes because there is a possibility that the user 70 may not make it in time for the movie screening time. On the other hand, a delay of 10 minutes is estimated to be acceptable to the user 70 because it is sufficient for the movie screening time.

For this reason, when the user 70 can arrive at the drop-off place "G" by 13:50 p.m., even when the travel route is changed, it is estimated that the user 70 will permit a change of the travel route. That is, it is estimated that the user 70 will not cancel the vehicle allocation request. Accordingly, the acceptable range of change calculation unit 217 which has grasped the schedule of the user 70 sets the acceptable range of change 90 in which it is acceptable for the travel route to be changed, such that the time difference between the time when the vehicle 40 arrives at the drop-off place "G" by traveling along the travel route 80 (13:40 p.m.), and the time when the vehicle 40 arrives at the drop-off place "G" by traveling along the travel route after the change, is equal to or less than the permissible time (10 minutes).

The acceptable range of change 90 illustrated in FIG. 3 indicates a range within which, even when the travel route is changed, the vehicle can arrive at the drop-off place "G" within the permissible time for the user 70, that is, by 13:50 p.m.

Next, as illustrated in FIG. 3, the facility extraction unit 218 extracts a facility 91 for depositing a forgotten item within the acceptable range of change set by the acceptable range of change calculation unit 217. The facility extraction unit 218 extracts the facility 91 by referring to the map database 241. The facility 91 is a place where forgotten items can be deposited. Examples include a convenience store and a police station. The facility extracted within an acceptable range of change is, for example, a place where the user 71 can go on foot; however, the facility is not limited thereto. The facility extracted within the acceptable range of change may be a place where the user 71 can travel by bicycle, or a place where the user 71 can travel by vehicle.

Next, as illustrated in FIG. 3, the travel route calculation unit 214 calculates a travel route 81 going through the facility 91 extracted by the facility extraction unit 218. Next, the travel route change unit 219 changes the travel route along which the vehicle 40 actually travels from the travel route 80 to the travel route 81, and transmits a command to the vehicle 40 to travel along the travel route 81.

As illustrated in FIG. 3, the vehicle 40 which has received a command from the travel route change unit 219 stops at the facility 91 to deposit the forgotten item of the user 71 before picking up the user 70. Before the vehicle 40 arrives at the facility 91, the computer 20 notifies the terminal device installed at the facility 91 of the time at which the vehicle 40 will arrive. Thus, a person working at the facility 91 can grasp when a forgotten item is to be delivered.

The computer 20 also notifies the user 71 of the name of the facility 91, the position information of the facility 91, the time when a forgotten item is to be delivered to the facility 91, and the like. The user 71 who has received this notification from the terminal device 61 can receive the forgotten item at the facility 91.

After depositing the forgotten item at the facility 91, the vehicle 40 travels to pick up the user 70 and travels to the drop-off place "G". The vehicle 40 arrives at the drop-off point G at 13:50 p.m., which is sufficient for the movie screening time. As described above, according to the first embodiment, even when the travel route 80 is changed, cancellation of a vehicle allocation request by the user 70 can be avoided. As a result, the requirement for vehicle allocation that the user 70 desires is satisfied, it is possible to provide a good service to the user 70, and thus a business loss of the business operator managing the vehicle 40 can be prevented. Further, changing the travel route 80 to the travel route 81 permits the forgotten item of the user 71 to be deposited at the facility 91, and thus the user 71 can receive the forgotten item.

When changing the travel route 80, the acceptable range of change calculation unit 217 may set the acceptable range of change 90 in which it is acceptable for the travel route to be changed, such that the delay time between the time when the vehicle 40 arrives at the drop-off place "G" by traveling along the travel route 80 before the change, and the time when the vehicle 40 arrives at the drop-off place "G" by traveling along the travel route after the change, is equal to or less than the permissible time for the user 70.

In the example illustrated in FIG. 3, the case where a forgotten item is detected in a vehicle has been described, but a forgotten item is not necessarily detected. This is because the place where the user 71 has forgotten an item is not necessarily the vehicle 40. If a forgotten item is not detected, the controller 405 transmits a signal to the computer 20 indicating that there is no forgotten item.

In the example illustrated in FIG. 3, when calculating an acceptable range of change, the time difference between the time when the vehicle 40 arrives at the drop-off place "G" by traveling along the travel route 80 and the time when the vehicle 40 arrives at the drop-off place "G" by traveling along the travel route after the change is used; however, the present invention is not limited thereto. When the user 70 is not in a vehicle yet, the acceptable range of change calculation unit 217 may set an acceptable range of change such that the time difference between the time when the vehicle 40 arrives at the boarding place A to pick up the user 70 who has requested a vehicle allocation by traveling along the travel route 80, and the time when the vehicle 40 arrives at the boarding place A by traveling along the travel route after the change, is equal to or less than the permissible time. This permissible time is also acquired by referring to the schedule data of the user 70.

Figure 4:
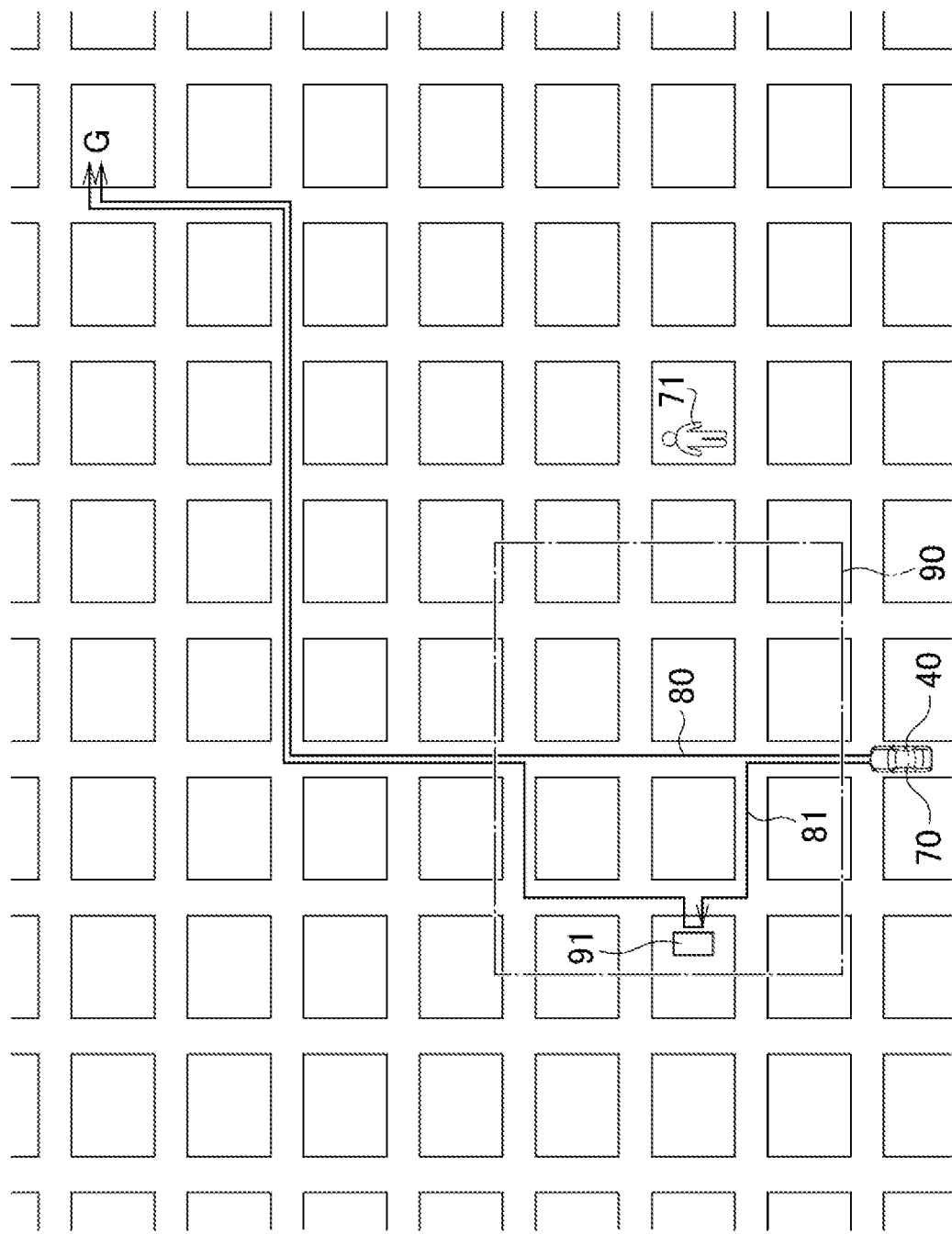
FIG. 4 is a diagram illustrating another example of a method for changing the acceptable range of change 90 and a travel route according to the first embodiment of the present invention.

In addition, in the example illustrated in FIG. 3, the scenario in which the user 70 is picked up has been described, but the present invention is not limited thereto. As illustrated in FIG. 4, when the signal S1 is transmitted while the user 70 is already in the vehicle 40, the same processing as described above is performed.

In some cases, the schedule acquisition unit 216 cannot acquire the schedule data of the user 70. In this case, the acceptable range of change calculation unit 217 may estimate the permissible time for the user 70 by referring to the customer database 242. The customer database 242 stores the time lengths permitted by a plurality of users in the past. The acceptable range of change calculation unit 217 refers to the customer database 242 and calculates an average time length of the time lengths permitted by the plurality of users. The acceptable range of change calculation unit 217 may estimate a calculated average time length as the permissible time for the user 70.

Note that the acceptable range of change calculation unit 217 may generally estimate a time (for example, 10 minutes) during which a delay of a vehicle can be permitted as the permissible time for the user 70.

The computer 20 notifies the user 70 that a travel route has been changed, the travel route 81 after the change, and the time (13:50 p.m.) at which a vehicle arrives at the drop-off place "G" when traveling along the travel route 81. At this time, the computer 20 may request approval from the user 70 as to whether the user 70 permits the change.

Figure 5:
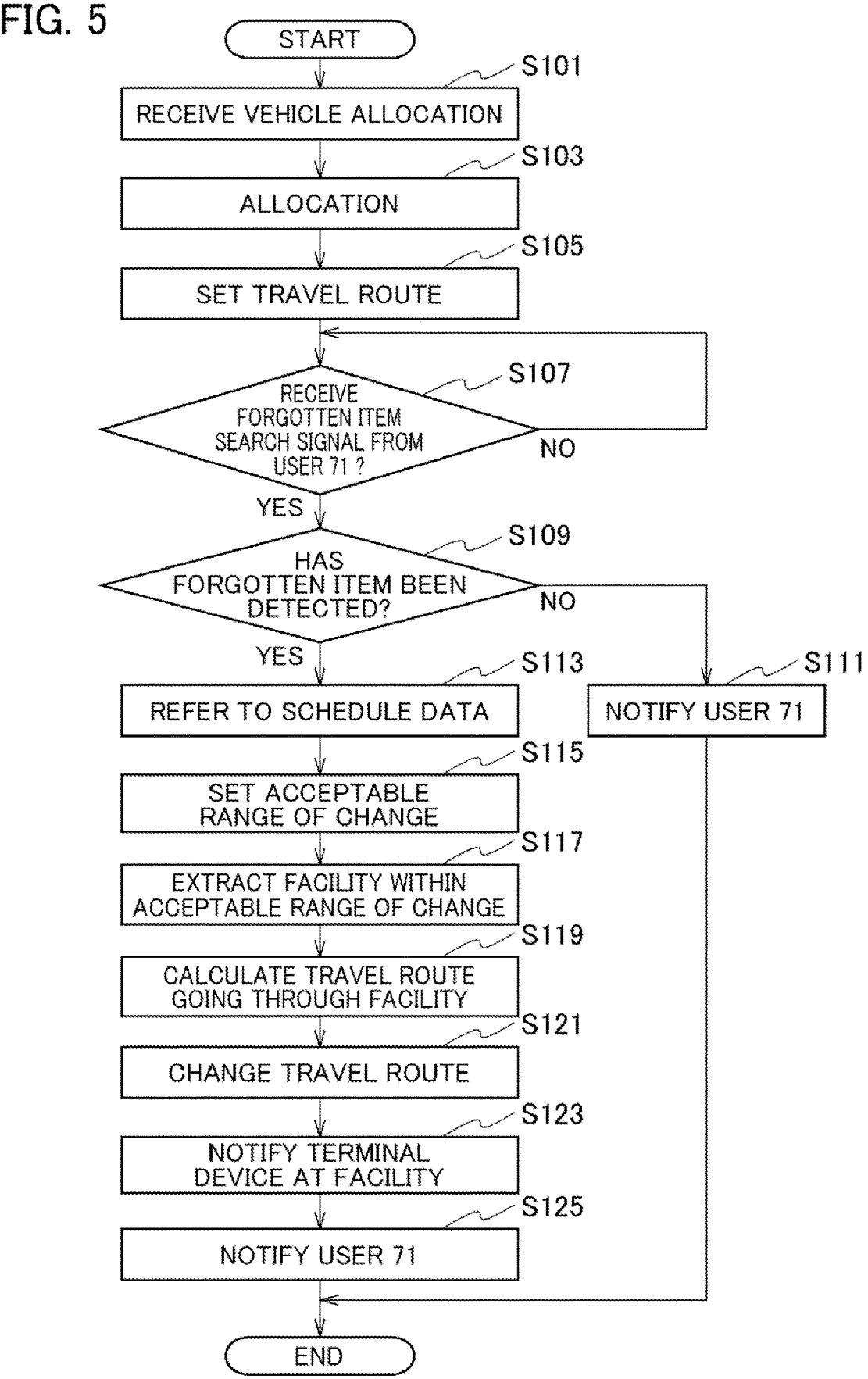
FIG. 5 is a flowchart illustrating an example of an operation of the vehicle allocation control system 10 according to the first embodiment of the present invention.

Next, an operation example of the vehicle allocation control system 10 will be described with reference to a flowchart of FIG. 5.

In step S101, the vehicle allocation reception unit 211 receives a vehicle allocation request from the user 70, which is input into the terminal device 60.

The processing proceeds to step S103, and the allocation unit 212 allocates a suitable vehicle (vehicle 40) from among the plurality of vehicles in response to the vehicle allocation request received by the vehicle allocation reception unit 211.

The processing proceeds to step S105, and the travel route calculating unit 214 calculates and sets a travel route 80 that arrives at a drop-off place where the user 70 desires by going through a boarding place where the user 70 desires from the current position of the vehicle 40. The travel route calculation unit 214 transmits a command to the vehicle 40 so as to travel along the set travel route 80.

When the vehicle 40 travels along the travel route 80, or when the vehicle 40 will be traveling soon along the travel route 80, in the case where the forgotten-item detection unit 215 receives a signal indicating that a forgotten item search is desired (signal S1) (YES in step S107), the processing proceeds to step S109.

In step S109, the forgotten-item detection unit 215 which has received the signal S1 from the user 71 refers to the customer database 242 to specify the vehicle (vehicle 40) which the user 71 got on last. The forgotten-item detection unit 215 transmits a signal for detecting the forgotten item (signal S2) to the specified vehicle 40. The controller 405 having received the signal S2 photographs the interior of the vehicle 40 using the camera 404. The controller 405 analyzes the camera image using predetermined image processing to detect the forgotten item. When the forgotten item has been detected (YES in step S109), the controller 405 transmits a signal indicating that the forgotten item has been detected (signal S3), to the computer 20. However, when the forgotten item is not detected (NO in step S109), the controller 405 transmits a signal indicating that the forgotten item has not been found to the computer 20.

In step S111, the computer 20 notifies the user 71 that there is no forgotten item in the vehicle 40.

In step S113, the schedule acquisition unit 216 which has received the signal S3 from the controller 405 acquires the schedule data of the user 70.

The processing proceeds to step S115, and the acceptable range of change calculation unit 217 which has grasped the schedule of the user 70 sets the acceptable range of change 90 in which it is acceptable for the travel route to be changed such that the time difference between the time when the vehicle 40 arrives at the drop-off place "G" by traveling along the travel route 80, and the time when the vehicle 40 arrives at the drop-off place "G" by traveling along the travel route after the change, is equal to or less than the permissible time (see FIG. 3).

The processing proceeds to step S117, and the facility extraction unit 218 extracts the facility 91 for depositing a forgotten item within an acceptable range of change set by the acceptable range of change calculation unit 217 (see FIG. 3).

The processing proceeds to step S119, and the travel route calculation unit 214 calculates the travel route 81 going through the facility 91 extracted by the facility extraction unit 218 (see FIG. 3).

The processing proceeds to step S121, and the travel route change unit 219 changes the travel route along which the vehicle 40 actually travels from the travel route 80 to the travel route 81, and transmits a command to the vehicle 40 to travel along the travel route 81.

The processing proceeds to step S123, and the computer 20 notifies the terminal device installed at the facility 91 of the arrival time of the vehicle 40.

The processing proceeds to step S125, and the computer 20 notifies the user 71 of the name of the facility 91, the position information of the facility 91, the time at which a forgotten item is to be delivered to the facility 91, and the like.

(Operational Effect)

As described above, according to the first embodiment, the following effects are acquired.

The CPU 21 (controller) of the computer 20 detects a forgotten item in a vehicle after setting a travel route 80 including a drop-off place "G". The computer 20 sets an acceptable range of change 90 in which it is acceptable for the travel route 80 to be changed such that the time difference between the time when the vehicle 40 arrives at the drop-off place "G" by traveling along the set travel route 80, and the time when the vehicle 40 arrives at the drop-off place "G" by traveling along the travel route after the change, is equal to or less than the permissible time. The computer 20 extracts the facility 91 for depositing a forgotten item within a set acceptable range of change. The computer 20 calculates the travel route 81 going through the extracted facility 91. The computer 20 changes the travel route 80 to the travel route 81. Since the travel route 80 is changed within an acceptable range of change, cancellation of the vehicle allocation request by the user 70 can be avoided even when the travel route 80 is changed. Thus, an operating loss of the business operator managing the vehicle 40 is prevented. Further, changing the travel route 80 to the travel route 81 permits the forgotten item of the user 71 to be deposited at the facility 91, and thus the user 71 can receive the forgotten item.

In addition, the computer 20 may set an acceptable range of change such that the time difference between the time when the vehicle 40 arrives at the boarding place "A" to pick up the user 70 who has requested a vehicle allocation by traveling along the travel route 80, and the time when the vehicle 40 arrives at the boarding place A by traveling along the travel route after the change, is equal to or less than the permissible time. Even when an acceptable range of change is set in this manner, cancellation of the vehicle allocation request by the user 70 can be avoided. Thus, an operating loss of the business operator managing the vehicle 40 is prevented.

In addition, the computer 20 may acquire data (schedule data) relating to an activity schedule of the user 70 who has requested a vehicle allocation via communication, and estimate the permissible time for the user 70 by referring to the data relating to the activity schedule of the user 70. An example of the data relating to the activity schedule is the data indicating "watching a movie at 14:00 p.m." described above. The computer 20 estimates the permissible time by referring to the data on the activity schedule of the user 70, and thus the computer 20 can set the acceptable range of change 90 in which it is acceptable for the user 70 to change the travel route.

The computer 20 further includes the storage device 24 for storing the time lengths permitted by a plurality of users in the past. The computer 20 may acquire the time lengths permitted by the plurality of users in the past from the storage device 24, and calculate an average time length of such time lengths permitted by the plurality of users in the past. Then, the computer 20 may estimate the calculated average time length as the permissible time for the user 70 who has requested a vehicle allocation. If it is not possible to acquire data relating to an activity schedule of the user 70, the computer 20 can set an acceptable range of change 90 in which it is acceptable for the user 70 to change a travel route by using this estimation method.

The computer 20 transmits a signal for detecting the forgotten item to the vehicle 40 when receiving a signal indicating that a forgotten item search is desired from the terminal device 61 possessed by the user 71 who has forgotten the item. Thus, the computer 20 can detect the forgotten item in the vehicle.

The computer 20 transmits, to the terminal device 61 possessed by the user 71 who has forgotten an item, the position information of the facility 91 where the vehicle 40 goes through and a time when the vehicle 40 arrives at the facility 91. Thus, the user 71 is able to know that the forgotten item is to be delivered to the facility 91, and thus it is possible for the user 71 to receive the forgotten item at the facility 91.

The computer 20 transmits the arrival time of the vehicle 40 to the terminal device installed at the facility 91 where the vehicle 40 goes through. Thus, a person working at the facility 91 can grasp when the forgotten item is to be delivered.

When the computer 20 detects a forgotten item in the vehicle 40 after setting a first travel route (corresponding to the travel route 80 in FIG. 3) including the drop-off place "G", the computer 20 calculates a first time (corresponding to 13:40 p.m. described above) at which the vehicle 40 arrives at the drop-off place "G" by traveling along the set first travel route. The computer 20 sets at least one second travel route (corresponding to the travel route 81 in FIG. 3) which is different from the first travel route and goes through a facility for depositing the forgotten item. The computer 20 calculates a second time (corresponding to 13:50 p.m. described above) at which the vehicle 40 arrives at the drop-off place "G" by traveling along the second travel route. The computer 20 changes the first travel route to the second travel route where the time difference between the first time and the second time is equal to or less than the permissible time. Thus, it is possible to respond to the user 71 who has forgotten an item in such a way as to satisfy a vehicle allocation request requirement of the next user 70 who has transmitted a vehicle allocation request. The second travel route is a route along which the vehicle 40 actually travels.

The computer 20 sets the acceptable range of change 90 in which it is acceptable for the first travel route to be changed, such that the time difference between the first time and the second time is equal to or less than the permissible time. The computer 20 acquires a facility database including the position information of the facility 91. The facility database is stored in the map database 241 (see FIG. 2). The computer 20 extracts the facility 91 existing within an acceptable range of change by using the facility database. The computer 20 sets the second travel route going through the extracted facility 91.

Second Embodiment

Figure 6:
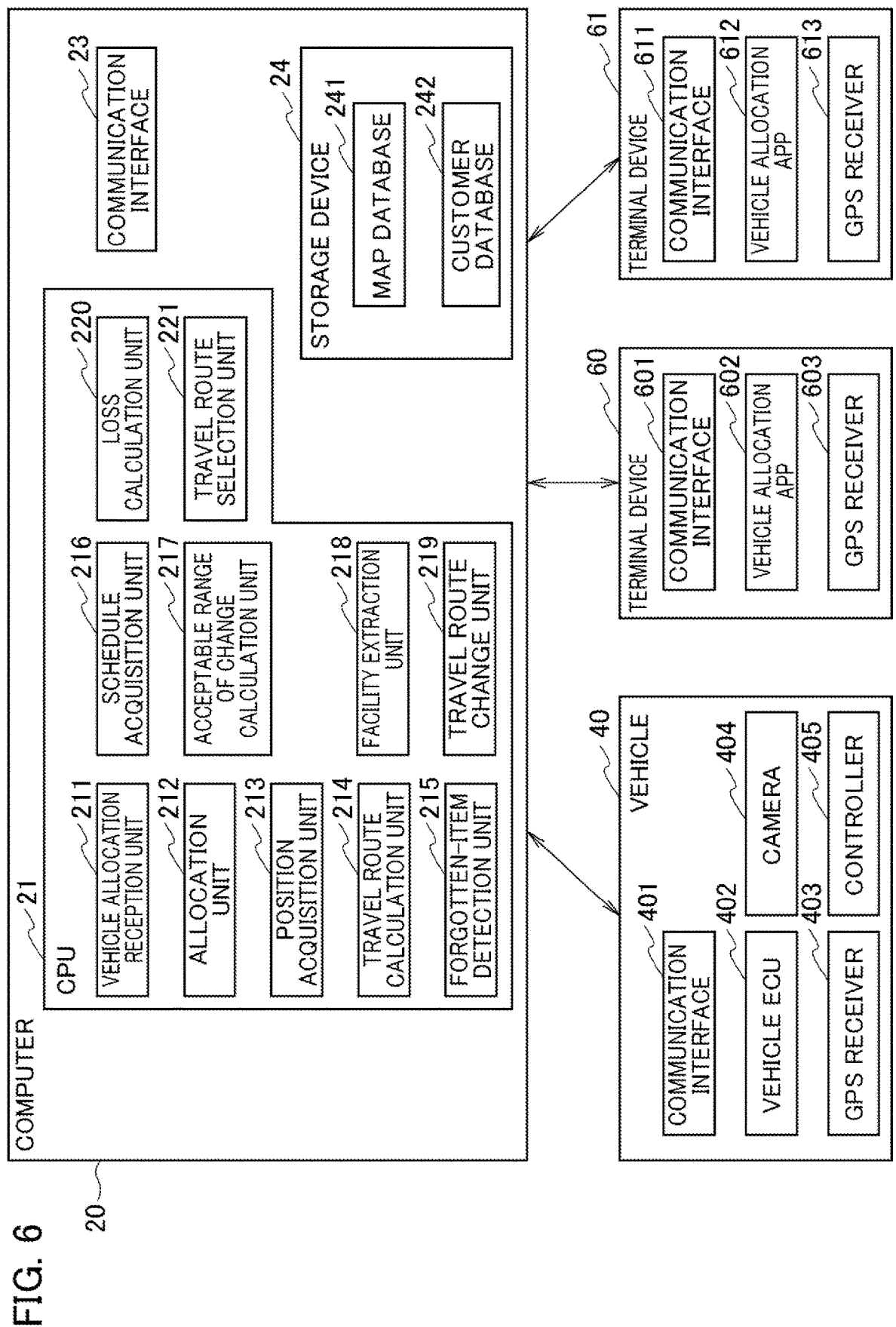
FIG. 6 is a functional block diagram of the computer 20, the vehicle 40, and the terminal devices 60 and 61 according to a second embodiment of the present invention.

Next, a second embodiment of the present invention will be described with reference to FIG. 6. The second embodiment differs from the first embodiment in that the computer 20 further includes a loss calculation unit 220 and a travel route selection unit 221. The configuration which overlaps with that of the first embodiment is omitted by quoting reference numerals. Hereinafter, the differences will be mainly described.

The loss calculation unit 220 calculates a loss when the vehicle 40 travels along respective travel routes, in the case where there are a plurality of travel routes after a change. The term "loss" here means an operating loss of the business operator managing the vehicle 40. This operating loss includes, for example, loss of time and loss of energy (gasoline, hydrogen, electricity, etc.).

The travel route selection unit 221 selects a travel route with a small loss calculated by the loss calculation unit 220.

An operation example of the vehicle allocation control system 10 according to the second embodiment will be described with reference to FIG. 7.

Figure 7:
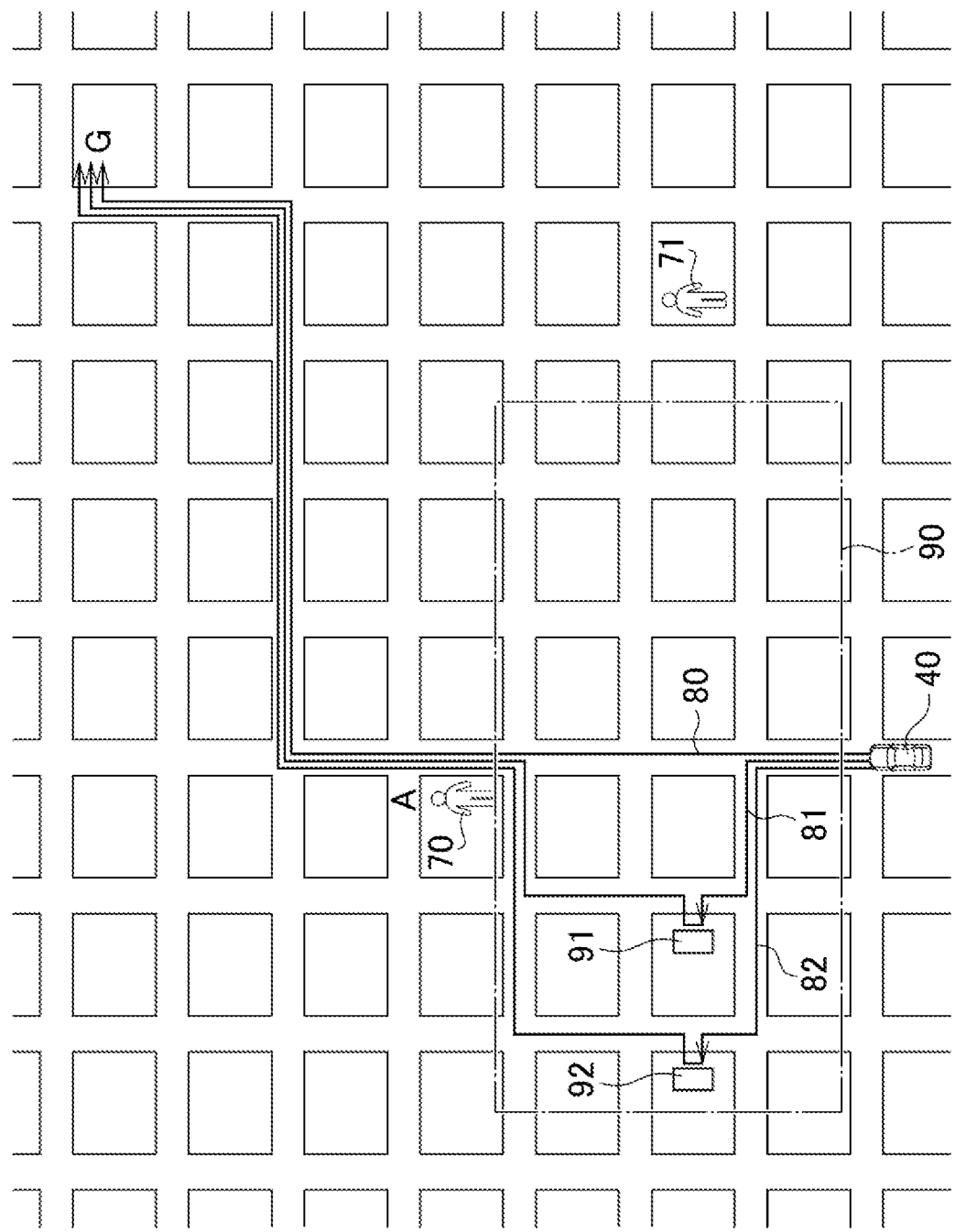
FIG. 7 is a diagram illustrating an example of a method for changing the acceptable range of change 90 and a travel route according to the second embodiment of the present invention.

Similar to the scenario illustrated in FIG. 3, the scenario illustrated in FIG. 7 is a scenario in which the vehicle 40 allocated by a vehicle allocation request from the user 70 travels to pick up the user 70. FIG. 7 differs from FIG. 3 in that two facilities (facilities 91 and 92) are extracted within an acceptable range of change.

In FIG. 7, the travel route calculation unit 214 calculates the travel route 81 going through the facility 91, and the travel route 82 going through the facility 92 which are extracted by the facility extraction unit 218. The travel routes 81 and 82 are both routes that the user 70 is presumed to permit a change. The travel routes 81 and 82 are merely candidates (travel route candidates) at the time when these routes are calculated.

As an example of selecting one of the travel routes 81 and 82, it is considered that a travel route with a smaller loss is selected. Accordingly, the loss calculation unit 220 calculates a loss when the vehicle 40 travels along the travel route 81, and a loss when the vehicle 40 travels along the travel route 82. Time or distance is used as an example of loss calculation.

The loss expression using time is expressed by the following expressions (1) and (2). Expression (1) represents a loss when vehicle 40 travels along the travel route 81, and Expression (2) represents a loss when vehicle 40 travels along the travel route 82.

$$(T-T1) \times \alpha \quad (1)$$

$$(T-T2) \times \alpha \quad (2)$$

T is the time required for the vehicle 40 to arrive at the drop-off place "G" when traveling along the travel route 80. T1 is the time required for the vehicle 40 to arrive at the drop-off place "G" when traveling along the travel route 81 going through the facility 91. T2 is the time required for the vehicle 40 to arrive at the drop-off place "G" when traveling along the travel route 82 going through the facility 92. $\alpha$ is a weight with respect to the time, and an optional value is set thereto. Since T1<T2 is acquired, Expression (1)<Expression (2) is satisfied. Accordingly, the travel route 81 has a smaller time loss than the travel route 82. The travel route selection unit 221 preferentially selects the travel route 81 with a smaller loss over the travel route 82 with a larger loss. The travel route change unit 219 changes the travel route along which the vehicle 40 actually travels from the travel route 80 to the travel route 81 selected by the travel route selection unit 221. The travel route change unit 219 transmits a command to the vehicle 40 to travel along the travel route 81. As a result, the loss of the business operator managing the vehicle is prevented.

The loss expression using a distance is expressed by the following Expressions (3) and (4). Expression (3) represents a loss when vehicle 40 travels along the travel route 81, and Expression (4) represents a loss when vehicle 40 travels along the travel route 82.

$$(D-D1) \times \beta \quad (3)$$

$$(D-D2) \times \beta \quad (4)$$

D is the distance required for the vehicle 40 to arrive at the drop-off place "G" when traveling along the travel route 80. D1 is the distance required for the vehicle 40 to arrive at the drop-off place "G" when traveling along the travel route 81 going through the facility 91. D2 is the distance required for the vehicle 40 to arrive at the drop-off place "G" when traveling along the travel route 82 going through the facility 92. $\beta$ is a weight with respect to the distance, and an optional value is set thereto. Since D1<D2 is acquired, Expression (3)<Expression (4) is satisfied. Accordingly, the travel route 81 has a smaller distance loss than the travel route 82. That is, the travel route 81 consumes less energy than the travel route 82. The travel route selection unit 221 preferentially selects the travel route 81 with a smaller loss over the travel route 82 with a larger loss. The travel route change unit 219 changes the travel route along which the vehicle 40 actually travels from the travel route 80 to the travel route 81 selected by the travel route selection unit 221. The travel route change unit 219 transmits a command to the vehicle 40 to travel along the travel route 81. As a result, the loss of the business operator managing the vehicle is prevented.

Figure 8:
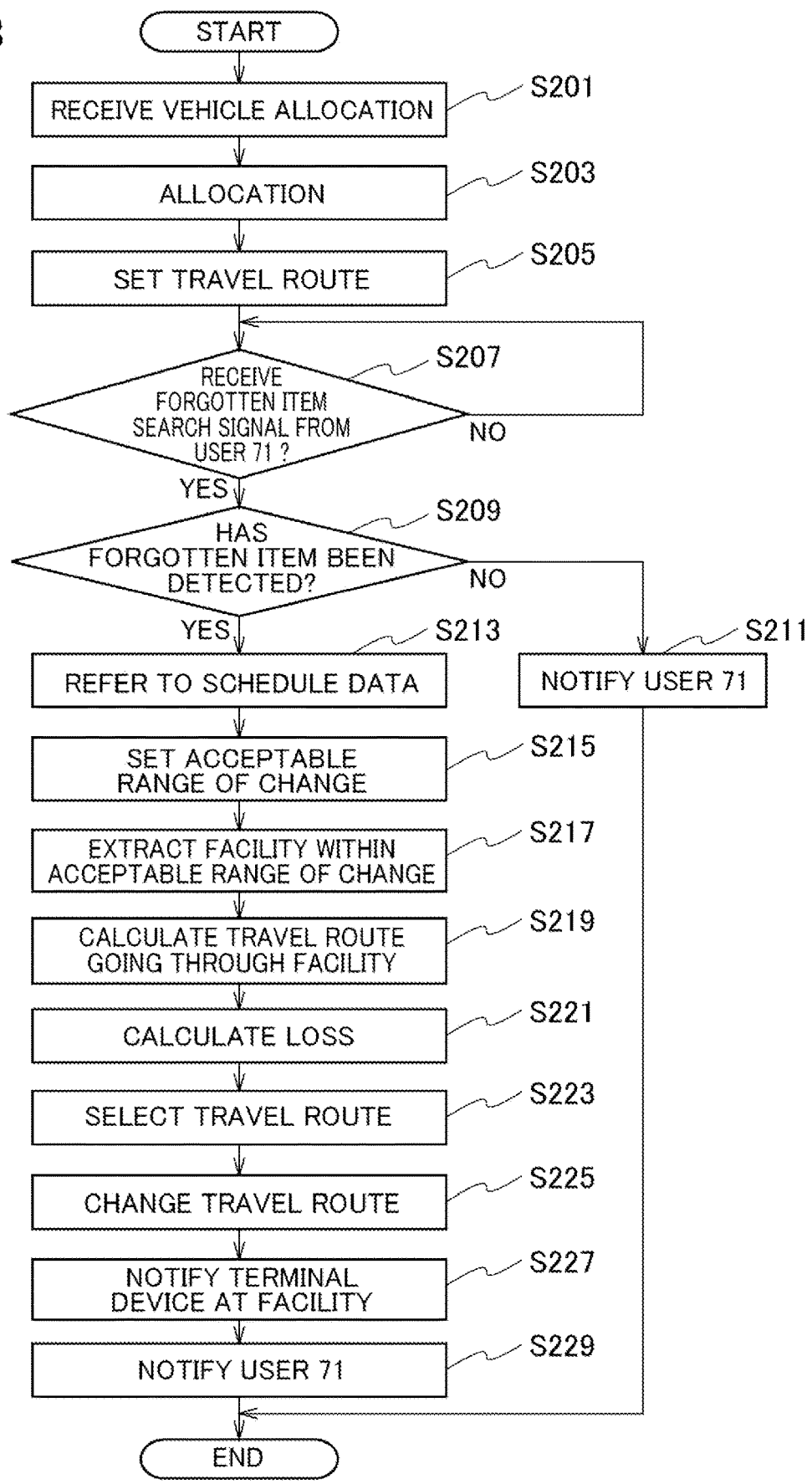
FIG. 8 is a flowchart illustrating an example of an operation of the vehicle allocation control system 10 according to the second embodiment of the present invention.

Next, an operation example of the vehicle allocation control system 10 according to the second embodiment will be described with reference to the flowchart of FIG. 8. However, since the processing of steps S201 to S219 and S225 to S229 are the same as the processing of steps S101 to S119 and S121 to S125 illustrated in FIG. 5, a description thereof will be omitted.

In step S221, the loss calculation unit 220 calculates a loss when the vehicle 40 travels along respective travel routes, in the case where there are a plurality of travel routes after a change. In the example illustrated in FIG. 7, the case where there are two travel routes after a change has been described, but the present invention is not limited thereto. In the case where there are three or more travel routes after a change, the loss calculation unit 220 calculates a loss when traveling along respective travel routes.

In the example illustrated in FIG. 7, the loss of time or distance has been described, but the present invention is not limited thereto. The loss calculation unit 220 may calculate a total loss of time and distance using both time and distance. The loss expression using both time and distance is expressed by the following Expressions (5) and (6). Expression (5) represents a loss when the vehicle 40 travels along the travel route 81, and Expression (6) represents a loss when the vehicle 40 travels along the travel route 82.

$$(T-T1) \times \alpha + (D-D1) \times \beta \quad (5)$$

$$(T-T2) \times \alpha + (D-D2) \times \beta \quad (6)$$

Since T1<T2 and D1<D2 are acquired, Expression (5)<Expression (6) is acquired. Accordingly, the travel route 81 has a smaller total loss of time and distance than the travel route 82.

The processing proceeds to step S223, and the travel route selection unit 221 preferentially selects the travel route with the smaller loss calculated by the loss calculation unit 220 over the travel route with the larger loss. As a result, the travel route selection unit 221 selects the travel route 81 having the smallest loss.

(Operational Effect)

As described above, according to the second embodiment, the following effects are acquired.

When a plurality of facilities are extracted within an acceptable range of change, the travel route calculation unit 214 sets respective travel route candidates (travel routes 81 and 82) going through respective facilities (facilities 91 and 92) (see FIG. 7). The computer 20 preferentially sets, as a second travel route, a travel route candidate (travel route 81) having a smaller loss relating to at least either time or distance from the current position of the vehicle 40 to an arrival at the drop-off place "G", over a travel route candidate (travel route 82) having a larger loss relating to at least either time or distance from the current position of the vehicle 40 to an arrival at the drop-off place "G", among the respective travel route candidates. As a result, the loss of the business operator managing the vehicle 40 is prevented. Thus, it is possible to respond to the user 71 who forgotten an item in such a way as to satisfy a vehicle allocation request requirement of the next user 70 who has transmitted a vehicle allocation request.

Third Embodiment

Figure 9:
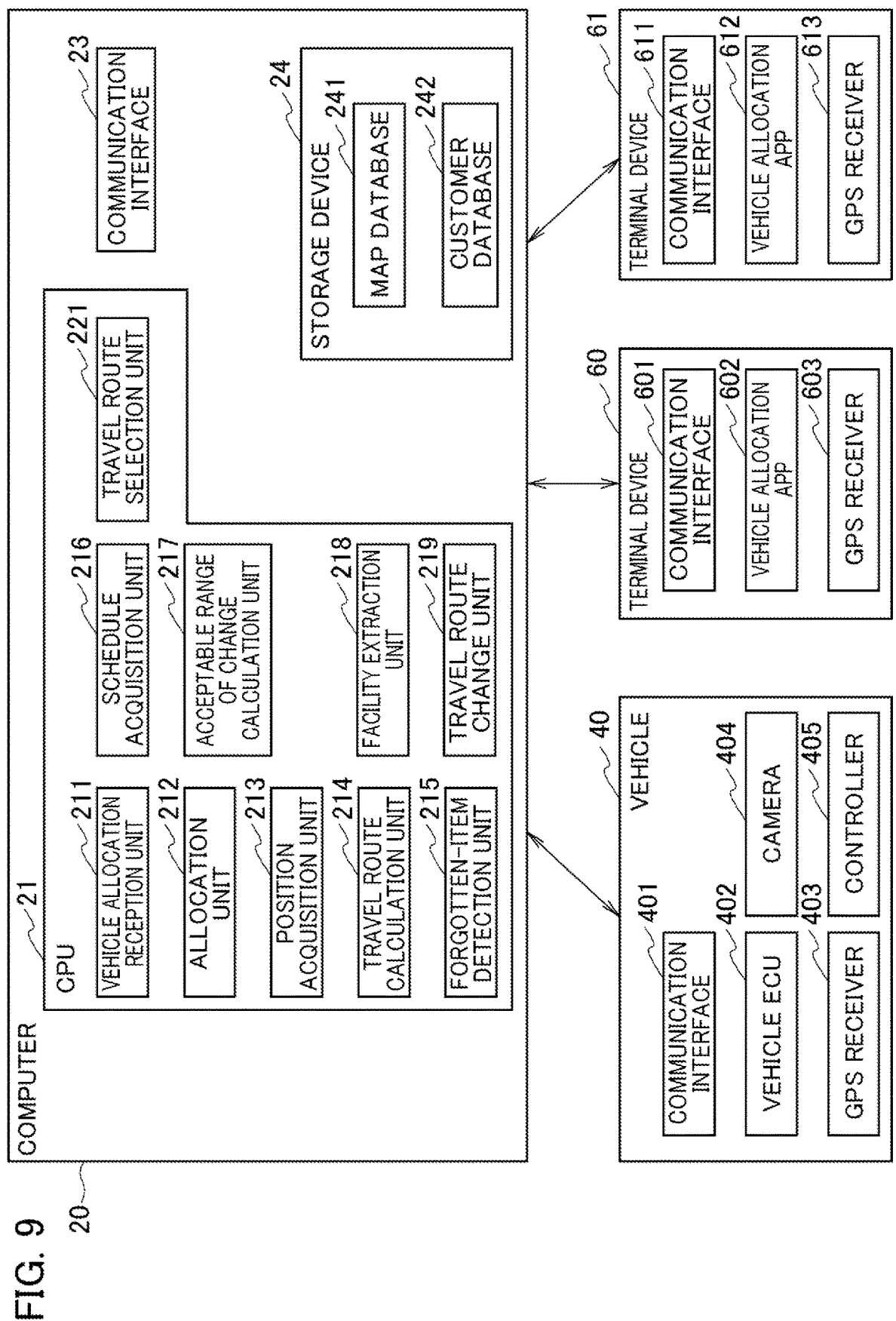
FIG. 9 is a functional block diagram of the computer 20, the vehicle 40, and the terminal devices 60 and 61 according to a third embodiment of the present invention.

Next, a third embodiment of the present invention will be described with reference to FIG. 9. The third embodiment differs from the first embodiment in that the computer 20 further includes the travel route selection unit 221. The configuration which overlaps with that of the first embodiment is omitted by quoting reference numerals. Hereinafter, the differences will be mainly described.

The travel route selection unit 221 selects a travel route which goes through a facility close to the current position of the user 71, in the case where there are a plurality of travel routes after a change.

An operation example of the vehicle allocation control system 10 according to the third embodiment will be described with reference to FIG. 10.

Figure 10:
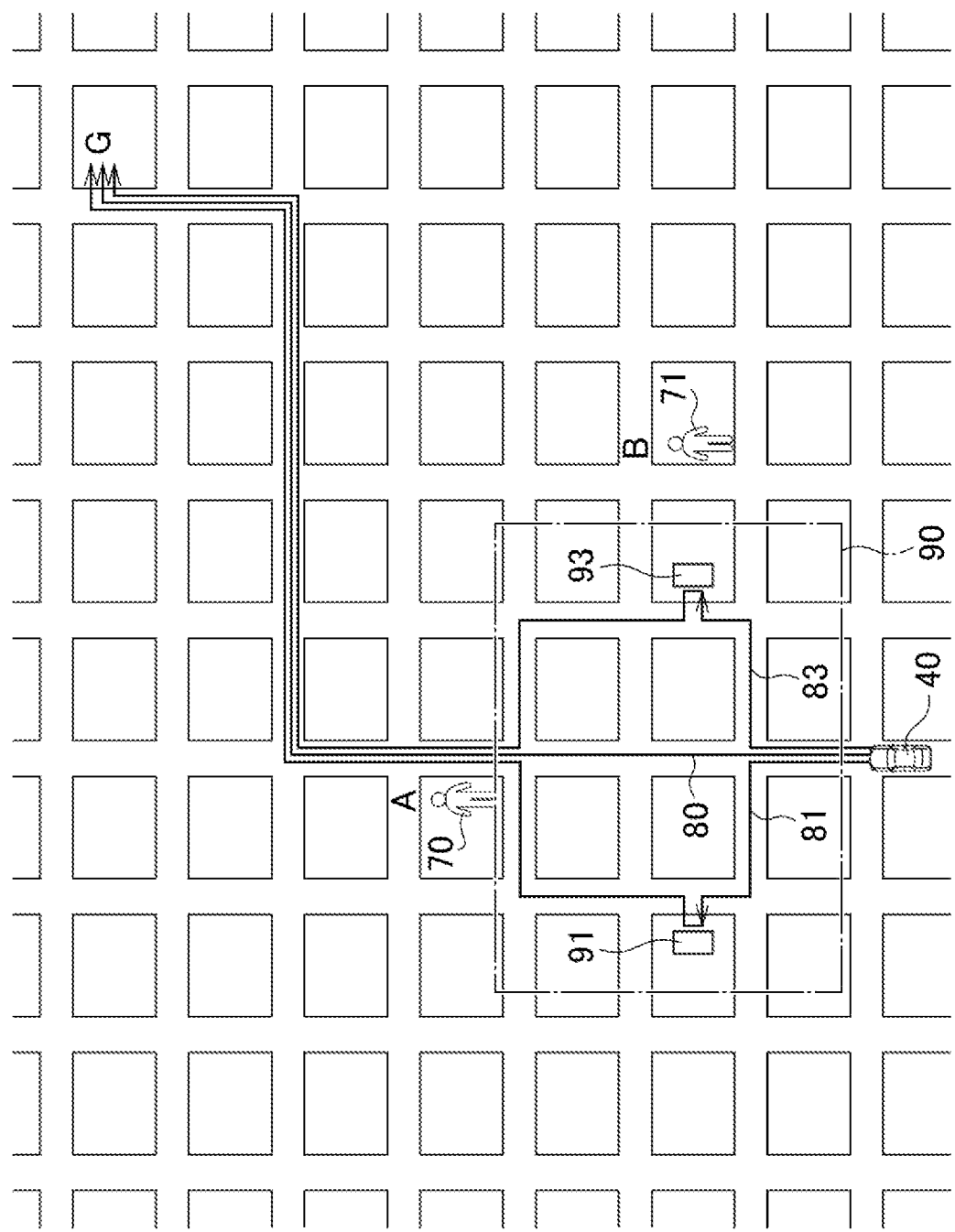
FIG. 10 is a diagram illustrating an example of a method for changing the acceptable range of change 90 and a travel route according to the third embodiment of the present invention.

Similar to the scenario illustrated in FIG. 3, the scenario illustrated in FIG. 10 is a scenario in which the vehicle 40 allocated by a vehicle allocation request from the user 70 travels to pick up the user 70. FIG. 10 differs from FIG. 3 in that two facilities (facilities 91 and 93) are extracted within an acceptable range of change. B in FIG. 10 illustrates the current position of the user 71.

In FIG. 10, the travel route calculation unit 214 calculates the travel route 81 going through the facility 91, and the travel route 83 going through the facility 93 which are extracted by the facility extraction unit 218. The travel routes 81 and 83 are both routes that the user 70 is presumed to permit a change. The travel routes 81 and 83 are merely candidates (travel route candidates) at the time when these routes are calculated.

As an example of selecting one of the travel routes 81 and 83, it is considered that a travel route which goes through a facility close to the user 71 is preferentially selected over a travel route which goes through a facility far from the user 71. Accordingly, the travel route selection unit 221 acquires the position information of the user 71 and the position information of the facilities 91 and 93, and calculates the distance from the current position B of the user 71 to the facility 91, and the distance from the current position B of the user 71 to the facility 93. As illustrated in FIG. 10, the distance from the current position B of the user 71 to the facility 93 is shorter than the distance from the current position B of the user 71 to the facility 91. That is, the facility 93 is closer to the current position B of the user 71 than the facility 91. Accordingly, the travel route selection unit 221 selects the travel route 83 going through the facility 93 closest to the current position B of the user 71. The travel route change unit 219 changes the travel route along which the vehicle 40 actually travels from the travel route 80 to the travel route 83 selected by the travel route selection unit 221. The travel route change unit 219 transmits a command to the vehicle 40 to travel along the travel route 83. As a result, the user 71 can receive a forgotten item in a shorter time compared with the case where a forgotten item is deposited at the facility 91. Thus, according to the third embodiment, it is possible to improve the convenience of the user 71.

Figure 11:
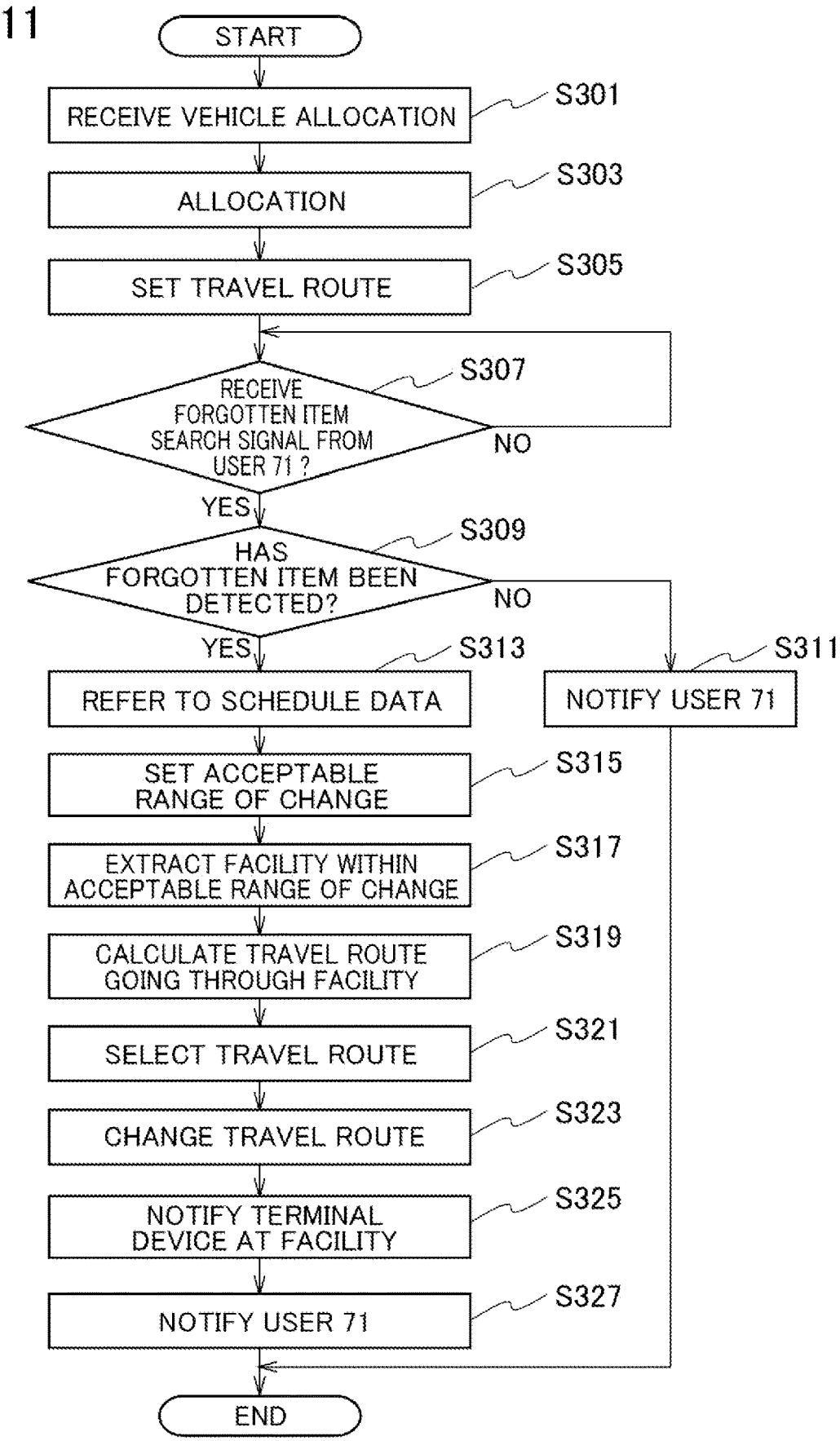
FIG. 11 is a flowchart illustrating an example of an operation of the vehicle allocation control system 10 according to the third embodiment of the present invention.

Next, an operation example of the vehicle allocation control system 10 according to the third embodiment will be described with reference to the flowchart of FIG. 11. However, since the processing of steps S301 to S319 and S323 to S327 are the same as the processing of steps S101 to S119 and S121 to S125 illustrated in FIG. 5, a description thereof will be omitted.

In step S321, the travel route selection unit 221 preferentially selects a travel route which goes through a facility close to the current position B of the user 71, over a travel route which goes through a facility far from the current position B of the user 71, in the case where there are a plurality of travel routes after a change. In the example illustrated in FIG. 10, the case where there are two travel routes after a change has been described, but the present invention is not limited thereto. In the case where there are three or more travel routes after a change, the travel route selection unit 221 selects a travel route going through the facility closest to the current position B of the user 71.

(Operational Effect)

As described above, according to the third embodiment, the following effects are acquired.

When a plurality of facilities are extracted within an acceptable range of change, the travel route calculation unit 214 sets respective travel route candidates (travel routes 81 and 83) going through respective facilities (facilities 91 and 93) (see FIG. 10). The computer 20 preferentially sets, as a second travel route, a travel route candidate (travel route 83) which goes through a facility close to the current position B of the user 71 who has forgotten an item than a travel route candidate (a travel route 81) which goes through a facility far from the current position B of the user 71 who has forgotten an item, among the respective travel route candidates. Accordingly, the user 71 can receive a forgotten item in a shorter time, and thus it is possible to improve the convenience of the user 71. Thus, it is possible to respond to the user 71 who forgotten an item in such a way as to satisfy a vehicle allocation request requirement of the next user 70 who has transmitted a vehicle allocation request.

Fourth Embodiment

Next, a fourth embodiment of the present invention will be described. The configuration of the fourth embodiment is the same as that of the second embodiment. However, the loss calculation unit 220 according to the fourth embodiment calculates a total of the loss when the vehicle 40 travels along respective travel routes and the loss of the user 71.

The loss of the user 71 means the distance from the current position B of the user 71 to a facility within an acceptable range of change. The loss of the user 71 becomes greater as the distance from the current position B of the user 71 to the facility increases, because the time required for receiving a forgotten item increases.

An operation example of the vehicle allocation control system 10 according to the fourth embodiment will be described with reference to FIG. 12.

Figure 12:
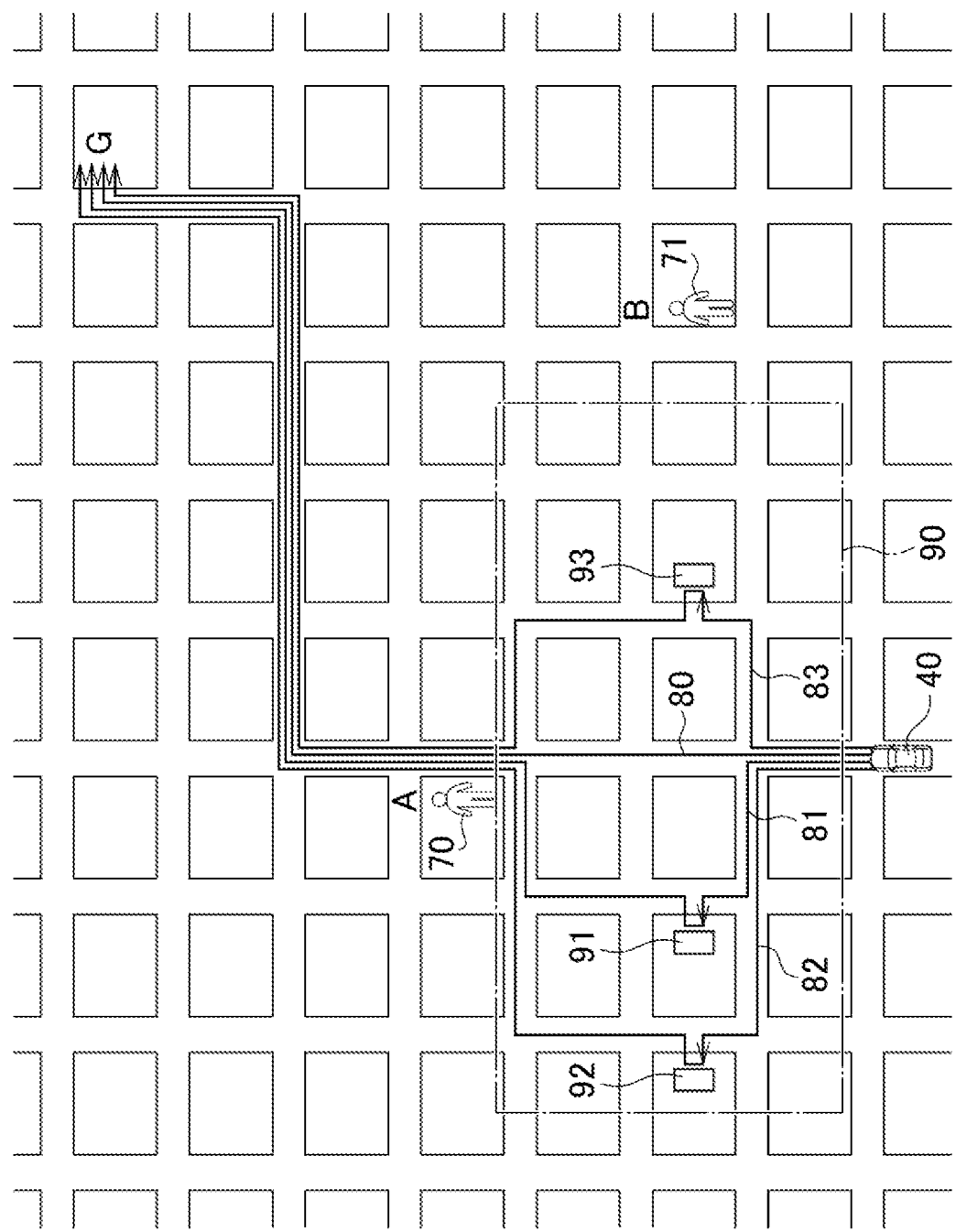
FIG. 12 is a diagram illustrating an example of a method for changing the acceptable range of change 90 and a travel route according to a fourth embodiment of the present invention.

Similar to the scenario illustrated in FIG. 3, the scenario illustrated in FIG. 12 is a scenario in which the vehicle 40 allocated by a vehicle allocation request from the user 70 travels to pick up the user 70. FIG. 12 differs from FIG. 3 in that three facilities (facilities 91, 92, and 93) are extracted within an acceptable range of change.

In FIG. 12, the travel route calculation unit 214 calculates the travel route 81 going through the facility 91, the travel route 82 going through the facility 92, and the travel route 83 going through the facility 93 which are extracted by the facility extraction unit 218. The travel routes 81, 82, and 83 are all routes to which it is assumed that the user 70 will permit a change. The travel routes 81, 82, and 83 are merely candidates (travel route candidates) at the time when these routes are calculated.

As an example of selecting one of the travel routes 81, 82 and 83, it is considered that a travel route with which a total of the loss of the vehicle 40 traveling along the respective travel routes and the loss of the user 71 is small is preferentially selected over a travel route with which a total of such losses is large. Accordingly, the loss calculation unit 220 calculates a total of losses when the vehicle 40 travels along the travel route 81, a total of losses when the vehicle 40 travels along the travel route 82, and a total of losses when the vehicle 40 travels along the travel route 83.

The loss expression is expressed by the following Expressions (7), (8) and (9). Expression (7) represents a total of losses when the vehicle 40 travels along the travel route 81. Expression (8) represents a total of losses when the vehicle 40 travels along the travel route 82. Expression (9) represents a total of losses when the vehicle 40 travels along the travel route 83.

$$(T-T1)\times\alpha+(D-D1)\times\beta+L1\times\gamma \quad (7)$$

$$(T-T2)\times\alpha+(D-D2)\times\beta+L2\times\gamma \quad (8)$$

$$(T-T3)\times\alpha+(D-D3)\times\beta+L3\times\gamma \quad (9)$$

L1 is the distance from the current position B of the user 71 to the facility 91. L2 is the distance from the current position B of the user 71 to the facility 92. L3 is the distance from the current position B of the user 71 to the facility 93. T3 is the time required for the vehicle 40 to arrive at the drop-off place "G" when traveling along the travel route 83 going through the facility 93. D3 is the distance required for the vehicle 40 to arrive at the drop-off place "G" when traveling along the travel route 83 going through the facility 93. $\gamma$ is a weight with respect to the distance from the current position of the user 71 to the facility, and an optional value is set thereto.

In FIG. 12, L3<L1<L2 is satisfied, T1<T3<T2 is satisfied, and D1<D3<D2 is satisfied. Accordingly, the loss of the vehicle 40 is smaller in the travel route 81 than in the travel routes 82 and 83. On the other hand, the loss of the user 71 is smaller in the travel route 83 than in the travel routes 81 and 82. Accordingly, the travel route calculation unit 214 preferentially selects the travel route 83 having a smaller loss than the travel routes 81 and 82 having a larger loss. Which of Expressions (7) to (9) is the smallest depends on the setting of $\alpha$, $\beta$, $\gamma$. When the loss of the vehicle 40 is emphasized, $\alpha$ and $\beta$ may be set larger and $\gamma$ may be set smaller (for example, $\alpha=1$, $\beta=1$, $\gamma=0.5$). On the other hand, when the loss of the user 71 is emphasized, $\alpha$ and $\beta$ may be set smaller and $\gamma$ may be set larger (for example, $\alpha=0.5$, $\beta=0.5$, $\gamma=1$). Expression (7) is the smallest when the loss of the vehicle 40 is emphasized. On the other hand, when the loss of the user 71 is emphasized, Expression (9) is the smallest. When the loss of the vehicle 40 is emphasized, the loss of the business operator managing the vehicle is prevented. On the other hand, when the loss of the user 71 is emphasized, the user 71 can receive a forgotten item in a shorter time, and thus it is possible to improve the convenience of the user 71.

Figure 13:
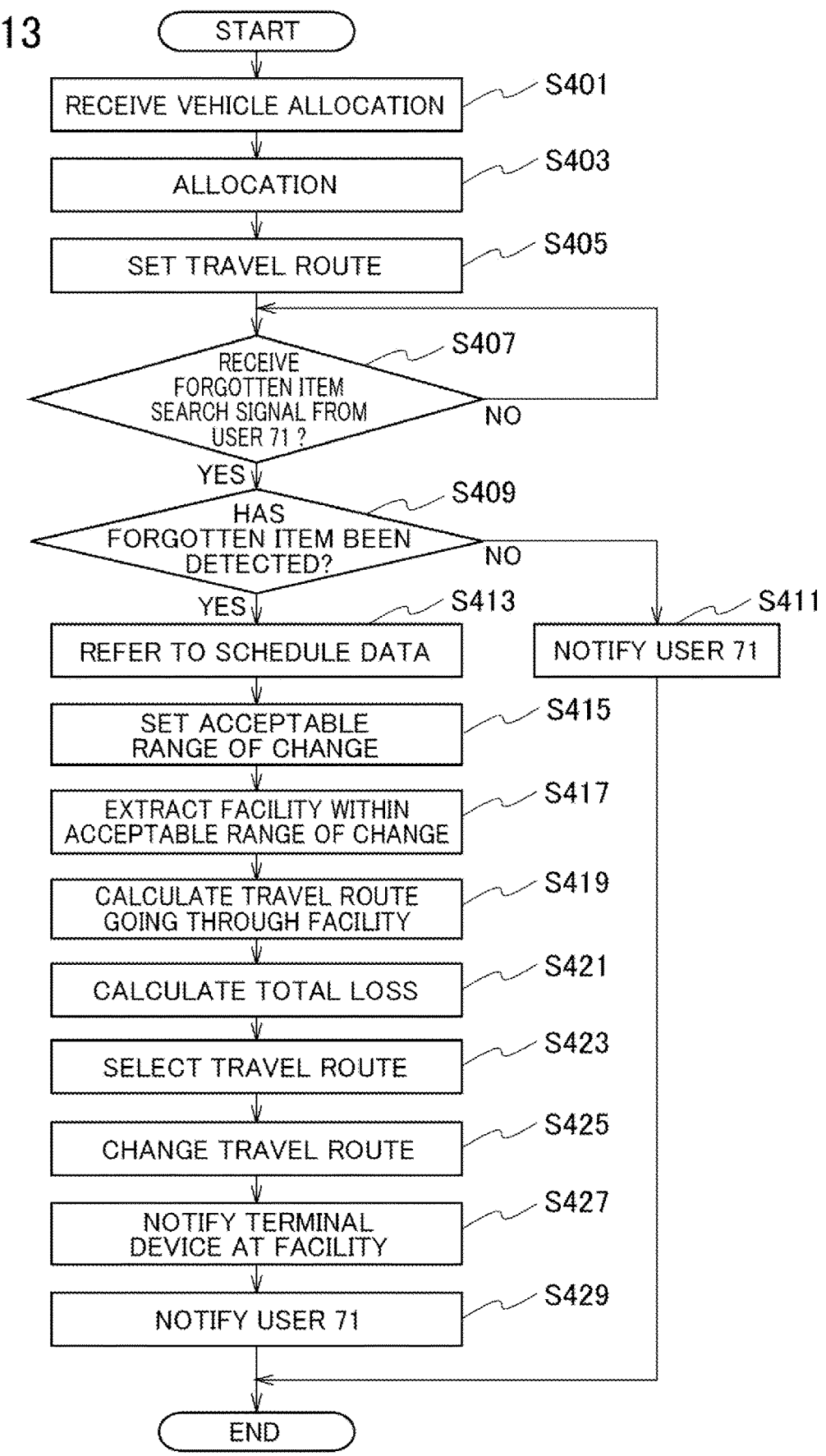
FIG. 13 is a flowchart illustrating an example of an operation of the vehicle allocation control system 10 according to the fourth embodiment of the present invention.

Next, an operation example of the vehicle allocation control system 10 according to the fourth embodiment will be described with reference to the flowchart of FIG. 13. However, since the processing of steps S401 to S419 and S425 to S429 are the same as the processing of steps S101 to S119 and S121 to S125 illustrated in FIG. 5, a description thereof will be omitted.

In step S421, the loss calculation unit 220 calculates a total of the loss when the vehicle 40 travels along respective travel routes and the loss of the user 71, in the case there are a plurality of travel routes after a change.

The processing proceeds to step S423, and the travel route selection unit 221 selects a travel route with the smallest loss calculated by the loss calculation unit 220.

(Operational Effect)

As described above, according to the fourth embodiment, the following effects are acquired.

When a plurality of facilities are extracted within an acceptable range of change, the travel route calculation unit 214 sets respective travel route candidates (travel routes 81, 82, 83) going through respective facilities (facilities 91, 92, 93) (see FIG. 12). The loss calculation unit 220 calculates a total of the loss relating to the time from the current position of the vehicle 40 to an arrival at the drop-off place "G", the loss relating to the distance from the current position of the vehicle 40 to an arrival at the drop-off place "G", and the loss relating to the distance from the current position B of the user 71 who has forgotten an item to the facility, among the respective travel route candidates. The travel route change unit 219 preferentially sets, as a second travel route, a travel route having a smaller total loss calculated by the loss calculation unit 220 than a travel route having a larger total loss. Thus, it is possible to take a balance of the loss of the vehicle allocation and the loss of the user 71. When the loss of the vehicle 40 is emphasized, the loss of the business operator managing the vehicle is prevented. On the other hand, when the loss of the user 71 is emphasized, the user 71 can receive a forgotten item in a shorter time, and thus it is possible to improve the convenience of the user 71.

Each of the functions described in the above embodiments may be implemented by one or more processing circuits. The processing circuit includes a programmed processing device such as a processing device including an electrical circuit. The processing circuit also includes devices such as an application specific integrated circuit (ASIC) arranged to perform the described functions and circuit components.

As noted above, although the embodiments of the present invention have been described, it should not be understood that the arguments and drawings forming part of this disclosure are intended to limit the present invention. Various alternative embodiments, examples, and operational techniques will be apparent to those skilled in the art from this disclosure.

In the above-described embodiment, when a plurality of facilities are extracted within an acceptable range of change, although a travel route along which the vehicle 40 actually travels is set by paying attention to a loss of the vehicle 40, or a loss of the user 71, the present invention is not limited thereto. For example, when a plurality of facilities are extracted within an acceptable range of change, the user 71 who has forgotten an item may be asked to select a facility, and a travel route going through the selected facility may be set.

Figure 14:
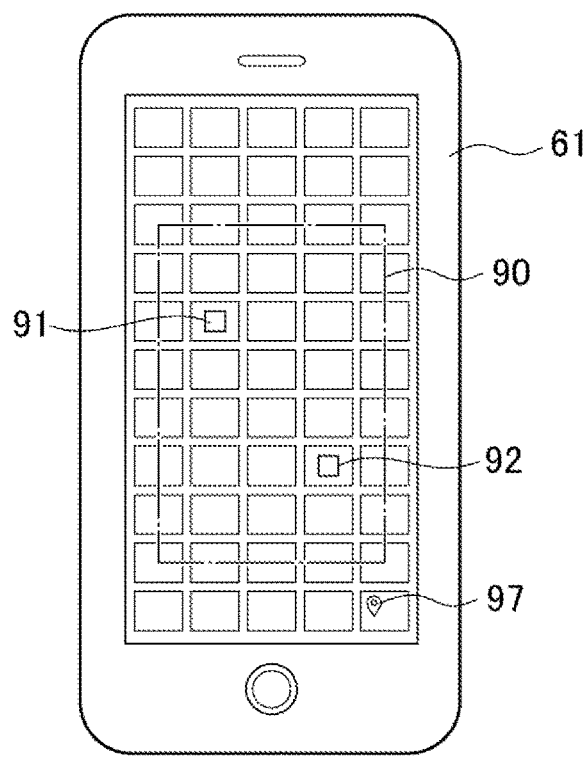
FIG. 14 is a diagram illustrating an example of a method for changing a travel route according to the other embodiment of the present invention.

For example, as illustrated in FIG. 14, the method for permitting the user 71 who has forgotten an item to select a facility includes displaying the acceptable range of change 90 and the facilities 91 and 92 within an acceptable range of change on the display of the terminal device 61. The user 71 who has seen a display can grasp at a glance a range in which a facility is selectable, and a facility within a selectable range. Then, the computer 20 may change a travel route so as to go through the facility, which is received from the terminal device 61, designated by the user 71. As a result, the user 71 can receive a forgotten item at the facility desired by the user 71, and thus it is possible to improve the convenience of the user 71. Reference numeral 97 illustrated in FIG. 14 indicates the current position of the user 71.

Figure 15:
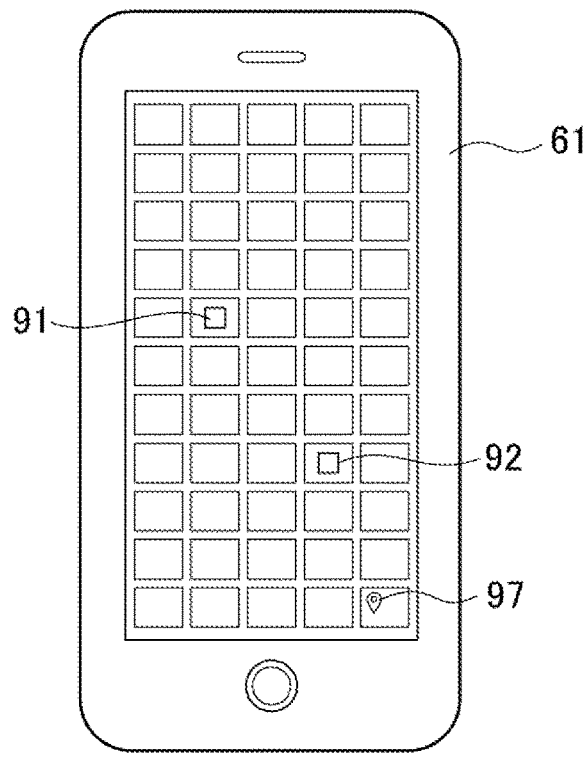
FIG. 15 is a diagram illustrating another example of a method for changing a travel route according to the other embodiment of the present invention.

As illustrated in FIG. 15, the acceptable range of change 90 may not be displayed, and only the facilities 91 and 92 within an acceptable range of change may be displayed.

LIST OF REFERENCE NUMERALS

10: Vehicle allocation control system
20: Computer
24: Storage device
211: Vehicle allocation reception unit
212: Allocation unit
213: Position acquisition unit
214: Travel route calculation unit
215: Forgotten-item detection unit
216: Schedule acquisition unit
217: Acceptable range of change calculation unit
218: Facility extraction unit
219: Travel route change unit
220: Loss calculation unit
221: Travel route selection unit

The invention claimed is:

1. A vehicle allocation control device, comprising:
a controller configured to control a travel route of a vehicle allocated in response to a vehicle allocation request received from a network,
wherein the controller is configured to:
receive a signal indicating that a forgotten item in the vehicle has been detected, via the network, after setting a first travel route including a drop-off place,
calculate a first time at which the vehicle arrives at the drop-off place by travelling along the set first travel route,
set at least one second travel route which is different from the first travel route and goes through a facility for depositing the forgotten item,
calculate a second time at which the vehicle arrives at the drop-off place by travelling along the second travel route,
determine whether a time difference between the first time and the second time is equal to or less than a permissible time,
when the time difference between the first time and the second time is equal to or less than the permissible time, change the first travel route to the second travel route where the time difference between the first time and the second time is equal to or less than the permissible time,
set an acceptable range of change in which it is acceptable for the first travel route to be changed, such that the time difference between the first time and the second time is equal to or less than the permissible time,
acquire a map database including position information of the facility,
extract the facility existing within the acceptable range of change by using the map database,
set the second travel route going through the extracted facility,
set respective travel route candidates going through a plurality of facilities when the respective facilities are extracted within the acceptable range of change,
autonomously select and set, as the second travel route, a travel route candidate having a smaller loss relating to at least either time or distance from a current position of the vehicle to arrival at the drop-off place, over a travel route candidate having a larger loss relating to at least either time or distance from the current position of the vehicle to arrival at the drop-off place, among the respective travel route candidates,
transmit a command to the vehicle and control the vehicle to autonomously travel along the second travel route,
notify, to a first terminal device installed at the facility, a time at which the vehicle arrives at the facility, and
notify, to a second terminal device possessed by the user who has forgotten the item, of a time at which the forgotten item is to be delivered to the facility.

2. The vehicle allocation control device according to claim 1, wherein the controller is configured to:
when a plurality of facilities are extracted within the acceptable range of change, set respective travel route candidates going through the respective facilities, and
set, as the second travel route, a travel route candidate which goes through a facility close to a current position of a user who has forgotten the item, over a travel route candidate which goes through a facility far from the current position of the user who has forgotten the item, among the respective travel route candidates.

3. The vehicle allocation control device according to claim 1, wherein the controller is configured to:
when a plurality of facilities are extracted within the acceptable range of change, set respective travel route candidates going through the respective facilities, and
set, as the second travel route, a travel route candidate having a smaller total loss of a loss relating to time from a current position of the vehicle to arrival at the drop-off place, a loss relating to distance from the current position of the vehicle to arrival at the drop-off place, and a loss relating to distance from a current position of a user who has forgotten the item to the facility, over a travel route candidate having a larger total loss, among the respective travel route candidates.

4. The vehicle allocation control device according to claim 1, wherein
the controller is configured to display the facility within the acceptable range of change, or display the acceptable range of change and the facility within the acceptable range of change, on a terminal device possessed by a user who has forgotten the item.

5. The vehicle allocation control device according to claim 4, wherein
the controller is configured to change the travel route so as to go through a facility designated by a user who has forgotten the item and received from the terminal device.

6. The vehicle allocation control device according to claim 1, wherein the controller is configured to set the acceptable range of change such that a time difference between a time when the vehicle arrives at a boarding place to pick up a user who has requested the vehicle allocation by traveling along the set travel route, and a time when the vehicle arrives at the boarding place by traveling along a travel route after a change, is equal to or less than the permissible time.

7. The vehicle allocation control device according to claim 1, wherein
the controller is configured to acquire data relating to an activity schedule of a user who has requested the vehicle allocation via communication, and estimate the permissible time for the user by referring to the data relating to the activity schedule of the user.

8. The vehicle allocation control device according to claim 1, further comprising a storage device for storing time lengths permitted by a plurality of users in the past, wherein the controller is configured to:
acquire the time lengths permitted by the plurality of users in the past from the storage device,
calculate an average time length of the time lengths permitted by the plurality of users in the past, and
estimate the calculated average time length as the permissible time for a user who has requested the vehicle allocation.

9. The vehicle allocation control device according to claim 1, wherein
the controller is configured to transmit a signal for detecting the forgotten item to the vehicle when receiving a signal indicating that a forgotten item search is desired from a terminal device possessed by a user who has forgotten the item.

10. The vehicle allocation control device according to claim 1, wherein
the controller is configured to transmit position information of the facility where the vehicle goes through, to a terminal device possessed by a user who has forgotten the item.

11. A vehicle allocation control system including:
a vehicle, and
a vehicle allocation control device capable of communicating with the vehicle, and controlling a travel route of the vehicle allocated in response to a vehicle allocation request received from a network,
wherein the vehicle allocation control device is configured to:
receive a signal indicating that a forgotten item in the vehicle has been detected, via the network, after setting a first travel route including a drop-off place,
calculate a first time at which the vehicle arrives at the drop-off place by travelling along the set first travel route,
set at least one second travel route which is different from the first travel route and goes through a facility for depositing the forgotten item,
calculate a second time at which the vehicle arrives at the drop-off place by travelling along the second travel route,
determine whether a time difference between the first time and the second time is equal to or less than a permissible time,
when the time difference between the first time and the second time is equal to or less than the permissible time, change the first travel route to the second travel route where the time difference between the first time and the second time is equal to or less than the permissible time,
set an acceptable range of change in which it is acceptable for the first travel route to be changed, such that the time difference between the first time and the second time is equal to or less than the permissible time,
acquire a map database including position information of the facility,
extract the facility existing within the acceptable range of change by using the map database,
set the second travel route going through the extracted facility,
set respective travel route candidates going through a plurality of facilities when the respective facilities are extracted within the acceptable range of change,
autonomously select and set, as the second travel route, a travel route candidate having a smaller loss relating to at least either time or distance from a current position of the vehicle to arrival at the drop-off place, over a travel route candidate having a larger loss relating to at least either time or distance from the current position of the vehicle to arrival at the drop-off place, among the respective travel route candidates,
transmit a command to the vehicle to autonomously travel along the second travel route,
notify the facility of an arrival time of the vehicle, and notify the user of a time at which the forgotten item is to be deposited to the facility.

12. A vehicle allocation control method for controlling a travel route of a vehicle allocated in response to a vehicle allocation request received from a network, the method comprising:
receiving a signal indicating that a forgotten item in the vehicle has been detected, via the network, after setting a first travel route including a drop-off place,
calculating a first time at which the vehicle arrives at the drop-off place by travelling along the set first travel route;
setting at least one second travel route which is different from the first travel route and goes through a facility for depositing the forgotten item;
calculating a second time at which the vehicle arrives at the drop-off place by travelling along the second travel route;
determining whether a time difference between the first time and the second time is equal to or less than a permissible time;
when the time difference between the first time and the second time is equal to or less than the permissible time, changing the first travel route to the second travel route where the time difference between the first time and the second time is equal to or less than the permissible time,
setting an acceptable range of change in which it is acceptable for the first travel route to be changed, such that the time difference between the first time and the second time is equal to or less than the permissible time;
acquiring a map database including position information of the facility;
extracting the facility existing within the acceptable range of change by using the map database;
setting the second travel route going through the extracted facility;

setting respective travel route candidates going through a plurality of facilities when the respective facilities are extracted within the acceptable range of change, autonomously selecting and setting, as the second travel route, a travel route candidate having a smaller loss relating to at least either time or distance from a current position of the vehicle to arrival at the drop-off place, over a travel route candidate having a larger loss relating to at least either time or distance from the current position of the vehicle to arrival at the drop-off place, among the respective travel route candidates, transmit a command to the vehicle to autonomously travel along the second travel route, notify the facility of an arrival time of the vehicle, and notify the user of a time at which the forgotten item is to be deposited to the facility.

* * * * *